US012668141B2

(12) United States Patent
Kamikihara

(10) Patent No.: US 12,668,141 B2
(45) Date of Patent: Jun. 30, 2026

(54) CHARGING SYSTEM, VEHICLE, CHARGE CONTROL DEVICE, AND CHARGING METHOD

(71) Applicant: TOYOTA JIDOSHA KABUSHIKI KAISHA, Toyota (JP)

(72) Inventor: Daisuke Kamikihara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 19 days.

(21) Appl. No.: 18/742,417

(22) Filed: Jun. 13, 2024

(65) Prior Publication Data

US 2024/0326619 A1      Oct. 3, 2024

Related U.S. Application Data

(63) Continuation of application No. 17/389,869, filed on Jul. 30, 2021, now abandoned.

(30) Foreign Application Priority Data

Aug. 28, 2020    (JP) ................................. 2020-144314

(51) Int. Cl.
    *B60L 53/16*          (2019.01)
    *B60L 53/22*          (2019.01)
                (Continued)

(52) U.S. Cl.
    CPC ............... *B60L 53/16* (2019.02); *B60L 53/22* (2019.02); *B60L 53/34* (2019.02); *B60L 53/35* (2019.02);
                (Continued)

(58) Field of Classification Search
    CPC .......... B60L 53/11; B60L 53/12; B60L 53/16; B60L 53/22; B60L 53/34; B60L 53/35;
                (Continued)

(56) References Cited

U.S. PATENT DOCUMENTS

2005/0269981 A1    12/2005    Sakurai
2009/0242291 A1    10/2009    Sagawa et al.
                (Continued)

FOREIGN PATENT DOCUMENTS

EP          2 105 343 B1    12/2019
JP          2011-15548 A     1/2011
                (Continued)

OTHER PUBLICATIONS

Nov. 14, 2023 Office Action issued in U.S. Appl. No. 17/389,869.
                (Continued)

*Primary Examiner* — Taelor Kim
*Assistant Examiner* — Johali A Torres Ruiz
(74) *Attorney, Agent, or Firm* — Oliff PLC

(57)            ABSTRACT

A charging system includes: a switch device and a control device. Each of charging ports is provided with a lid configured to open and close a corresponding one of the charging ports. The control device is configured to determine whether a predetermined charge prohibition condition is satisfied before starting charging an electric energy storage device using any one of the charging ports, and when the predetermined charge prohibition condition is satisfied, keep each of power paths from the charging ports to the electric energy storage device disconnected. The predetermined charge prohibition condition is satisfied when the lid of at least one charging port that is included in the charging ports and that is other than the charging port to be used is open.

5 Claims, 17 Drawing Sheets

(51) Int. Cl.

| | |
|---|---|
| *B60L 53/34* | (2019.01) |
| *B60L 53/35* | (2019.01) |
| *B60L 53/60* | (2019.01) |
| *H02J 7/02* | (2016.01) |
| *H02J 7/70* | (2026.01) |
| *H02J 50/12* | (2016.01) |

(52) U.S. Cl.
CPC ................ *B60L 53/60* (2019.02); *H02J 7/02* (2013.01); *H02J 7/751* (2026.01); *H02J 50/12* (2016.02); *B60L 2210/30* (2013.01); *H02J 2207/20* (2020.01)

(58) Field of Classification Search
CPC .... B60L 53/60; B60L 2210/30; H02J 7/0031; H02J 7/0042; H02J 7/0045; H02J 7/02; H02J 50/10; H02J 50/12; H02J 50/90; H02J 2207/20; Y02T 10/70; Y02T 10/7072; Y02T 90/12; Y02T 90/14
See application file for complete search history.

(56) References Cited

U.S. PATENT DOCUMENTS

| | | | | |
|---|---|---|---|---|
| 2011/0151693 | A1 | 6/2011 | Loo et al. | |
| 2012/0083148 | A1 | 4/2012 | Hirashita et al. | |
| 2012/0086267 | A1 | 4/2012 | Ichikawa | |
| 2012/0330489 | A1* | 12/2012 | Masuda | B60L 3/0069 |
| | | | | 701/22 |
| 2013/0106365 | A1 | 5/2013 | Ang | |
| 2013/0249282 | A1* | 9/2013 | Ishii | B60L 53/65 |
| | | | | 307/10.1 |

| | | | | |
|---|---|---|---|---|
| 2015/0130414 | A1* | 5/2015 | Izumi | H02J 5/00 |
| | | | | 320/109 |
| 2015/0137755 | A1 | 5/2015 | Sadano et al. | |
| 2016/0344131 | A1* | 11/2016 | Kanamori | H01R 13/447 |
| 2017/0197515 | A1* | 7/2017 | Southey | B60K 15/05 |
| 2018/0226813 | A1 | 8/2018 | Ando | |
| 2019/0225096 | A1* | 7/2019 | Hiroe | B60L 53/67 |
| 2020/0247218 | A1* | 8/2020 | Zheng | B60H 1/3222 |
| 2021/0016730 | A1* | 1/2021 | Maruyama | H02M 7/04 |
| 2021/0086601 | A1 | 3/2021 | Choi et al. | |

FOREIGN PATENT DOCUMENTS

| | | | | |
|---|---|---|---|---|
| JP | 2011-178317 | A | | 9/2011 |
| JP | 2011-205755 | A | | 10/2011 |
| JP | 2012-080646 | A | | 4/2012 |
| JP | 2013-179723 | A | | 9/2013 |
| JP | 2013212001 | A | * | 10/2013 |
| JP | 2015-095916 | A | | 5/2015 |
| JP | 2015-182655 | A | | 10/2015 |
| JP | 2016-52160 | A | | 4/2016 |
| JP | 2018-129956 | A | | 8/2018 |
| JP | 2019-129557 | A | | 8/2019 |
| JP | 2019-165544 | A | | 9/2019 |
| JP | 2020-104666 | A | | 7/2020 |
| WO | 2011/001534 | A1 | | 1/2011 |
| WO | 2011/107851 | A1 | | 9/2011 |
| WO | 2012/011176 | A1 | | 1/2012 |

OTHER PUBLICATIONS

Mar. 14, 2024 Office Action issued in U.S. Appl. No. 17/389,869.
Jan. 29, 2025 Office Action issued in U.S. Appl. No. 18/742,470.
Jul. 16, 2025 U.S. Office Action issued in U.S. Appl. No. 18/742,470.

* cited by examiner

≪ COMPARATIVE EXAMPLE ≫

NOTIFICATION SCREEN

FIG. 14

CHARGING SYSTEM, VEHICLE, CHARGE CONTROL DEVICE, AND CHARGING METHOD

CROSS-REFERENCE TO RELATED APPLICATION

This application is a Continuation of application Ser. No. 17/389,869 filed Jul. 30, 2021, which claims priority to Japanese Patent Application No. 2020-144314 filed on Aug. 28, 2020, incorporated herein by reference in its entirety.

BACKGROUND

1. Technical Field

The present disclosure relates to charging systems, vehicles, charge control devices, and charging methods.

2. Description of Related Art

Japanese Unexamined Patent Application Publication No. 2018-129956 (JP 2018-129956 A) discloses a charging system that charges a secondary battery (electric energy storage device) with electric power supplied to each of a first charging port and a second charging port.

SUMMARY

In the charging system described in JP 2018-129956 A, a first relay and a second relay are provided near the first charging port and the second charging port, respectively. When a charging connector is connected to the first charging port, the first relay near the first charging port is turned on (connected), and the second relay near the second charging port is turned off (disconnected). As the first relay is turned on, electric power supplied to the first charging port is allowed to be output from the first charging port to the secondary battery side. During this charging of the secondary battery, no voltage is applied to the second charging port as the second relay is turned off. It is therefore considered safe (i.e., the risk of an electric shock is low) even if terminals of the second charging port are exposed while the secondary battery is being charged using the first charging port.

In the charging system described in JP 2018-129956, safety is ensured by performing the above control. In the above control, however, the first relay and the second relay are provided for the first charging port and the second charging port, respectively, and the first relay and the second relay are individually controlled to different states according to which of the first charging port and the second charging port are used. Such complicated control is disadvantageous in terms of both safety and cost. The more complicated the control, the more likely a malfunction will occur.

The present disclosure was made to solve the above problems, and it is an object of the present disclosure to improve safety by simple control in a charging system that charges an electric energy storage device with electric power supplied to each of a plurality of charging ports.

A charging system according to a first aspect of the present disclosure is configured to charge an electric energy storage device with electric power supplied to each of a plurality of charging ports. This charging system includes: a switch device configured to switch between connection and disconnection of each of power paths from the charging ports to the electric energy storage device; and a control device configured to control the switch device. Each of the charging ports is provided with a lid configured to open and close a corresponding one of the charging ports. The control device is configured to determine whether a predetermined charge prohibition condition is satisfied before starting charging the electric energy storage device using any one of the charging ports, and when the predetermined charge prohibition condition is satisfied, keep each of the power paths from the charging ports to the electric energy storage device disconnected. The predetermined charge prohibition condition is satisfied when the lid of at least one charging port that is included in the charging ports and that is other than the charging port to be used is open.

Hereinafter, the charging port to be used out of the charging ports is also referred to as the "used port." The charging port other than the charging port to be used out of the charging ports is also referred to as the "unused port."

In the above charging system, the charge prohibition condition is satisfied when the lid of the unused port is open. When the charge prohibition condition is satisfied, each of the power paths from the charging ports to the electric energy storage device is kept disconnected. Charging will not be started unless the lid of every unused port is closed. In this configuration, as the power paths of all the charging ports are kept disconnected, control can be simplified.

Even if a voltage is applied to any unused port when charging is started, it is safe because the lid of the unused port is closed (i.e., terminals of the unused port are not exposed). As the terminals of the unused port are covered by the lid, a user is physically prohibited from touching the terminals of the unused port.

As described above, according to the above configuration, safety in the charging system can be improved by simple control.

The switch device may include a relay disposed in a common part of the power paths from the charging ports to the electric energy storage device and configured to switch between connection and disconnection of the common part.

In the charging system including the switch device, the control device can switch between connection and disconnection of each of the power paths from the charging ports to the electric energy storage device by switching the state (connected or disconnected state) of one relay. Accordingly, the control is simplified and cost is reduced.

The relay may be a normally-off switch. As the relay is turned off (disconnected) when not energized, safety is improved.

The charging ports may include a plurality of contact charging ports. The control device may be configured to determine whether the predetermined charge prohibition condition is satisfied at a time when a charging connector is connected to any one of the contact charging ports before charging of the electric energy storage device is started using any one of the contact charging ports.

When the charging connector is connected to the charging port, it is highly likely that charging will be performed using the charging port to which the charging connector is connected. As the charging connector is connected to the terminals of the charging port, the terminals of the charging port are not exposed. Accordingly, the user is less likely to touch the terminals of the used port.

Each of the contact charging ports may be a charging port that receives direct current power (hereinafter, also referred to as "DC port").

When charging the electric energy storage device using an alternating current (AC) port that receives alternating current power (e.g., a charging port compatible with a standard charger), alternating current power supplied to the AC port is converted into direct current power, and the direct current power is supplied to the electric energy storage device. On the other hand, when charging the electric energy storage device using a DC port that receives direct current power (e.g., a charging port compatible with a quick charger), such power conversion (AC-to-DC conversion) is not necessary. Since there is no AC-to-DC conversion circuit between the DC port and the electric energy storage device, the voltage of the electric energy storage device tends to be applied to the DC port when the DC port and the electric energy storage device are electrically connected. Therefore, a particularly high level of safety is required in the configuration in which each of the contact charging ports is a DC port.

The contact charging ports may include a manual charging port to which the charging connector is connected by a user and an automatic charging port to which the charging connector is automatically connected.

In manual charging in which the user connects the charging connector to the charging port to perform charging, the user needs to do a lot of work and therefore tends to forget to close the lid. On the other hand, in automatic charging in which the charging connector is automatically connected to the charging port to perform charging, the user does not have to do so much work and therefore tends to get distracted. In the configuration in which the contact charging ports include both a manual charging port and an automatic charging port, a particularly high level of safety is required.

Any of the above charging systems may further include a notification device configured to be controlled by the control device. The control device may be configured to, when the control device determines that the predetermined charge prohibition condition is satisfied before starting charging the electric energy storage device, notify a user that the predetermined charge prohibition condition is satisfied using the notification device.

In the above configuration, when the charge prohibition condition is satisfied, the notification device notifies the user that the charge prohibition condition is satisfied. The user can start charging the electric energy storage device by causing the charging prohibition condition not to be satisfied.

The control device may be configured to, when the control device determines that the predetermined charge prohibition condition is satisfied before starting charging the electric energy storage device, prompt the user to close the lid of the unused port by using the notification device. The notification device may notify the user of the location of the unused port with an open lid.

The control device may be configured to, when the control device determines that the predetermined charge prohibition condition is not satisfied before starting charging the electric energy storage device, connect the power path from the charging port to be used to the electric energy storage device to start charging the electric energy storage device. The predetermined charge prohibition condition may not be satisfied when the lid of each of all the charging ports excluding the charging port to be used is closed.

In the above configuration, charging of the electric energy storage device is started when the lid of every unused port is closed. According to the above configuration, the electric energy storage device can be charged safely.

The charge prohibition condition is not limited to the above charge prohibition condition, and may be satisfied both in the case where the lid of any unused port is open and in the case where the lid of any unused port is in an unlocked state. The charge prohibition condition may be set so as not to be satisfied when the lid of every unused port is closed and the lid of every unused port is in a locked state.

The control device may be configured to determine whether the predetermined charge prohibition condition is satisfied during charging of the electric energy storage device, and when the control device determines that the predetermined charge prohibition condition is satisfied, disconnect each of the power paths from the charging ports to the electric energy storage device to stop charging the electric energy storage device.

In the above configuration, when the lid of the unused port is opened during charging of the electric energy storage device, each of the power paths from the charging ports to the electric energy storage device is disconnected and charging of the electric energy storage device is stopped. Safety during charging in the charging system is thus improved.

A charging system according to a second aspect of the present disclosure is configured to charge an electric energy storage device with electric power supplied to each of a plurality of charging ports. This charging system includes: a switch device configured to switch between connection and disconnection of each of power paths from the charging ports to the electric energy storage device; and a control device configured to control the switch device. The charging ports include a first charging port and a second charging port, an AC-to-DC converter circuit being present in the power path from the first charging port to the electric energy storage device, and no AC-to-DC converter circuit being present in the power path from the second charging port to the electric energy storage device. The second charging port is provided with a lid configured to open and close the second charging port. The control device is configured to determine whether a predetermined charge prohibition condition is satisfied before starting charging the electric energy storage device using any one of the charging ports, and when the predetermined charge prohibition condition is satisfied, keep each of the power paths from the charging ports to the electric energy storage device disconnected. The predetermined charge prohibition condition is satisfied when the lid of the second charging port that is not used is open.

Since the AC-to-DC converter circuit is present in the power path (charging path) from the first charging port to the electric energy storage device, direct current power output from the electric energy storage device is cut off by the AC-to-DC converter circuit. Accordingly, even if the first charging port is electrically connected to the electric energy storage device, the voltage of the electric energy storage device is not applied to the first charging port. With such a configuration, safety can be ensured even if the first charging port and the electric energy storage device are electrically connected when the first charging port is not used.

In the above charging system, in the case where the lid of the second charging port that is not used is open before charging of the electric energy storage device is started, the control device keeps each of the power paths from the charging ports to the electric energy storage device disconnected. Even with this configuration, safety in the charging system can be improved by simple control.

In the charging system according to the second aspect, each of the number of first charging ports and the number of second charging ports may be one or more. As the AC-to-DC converter circuit is present in the power path from the first charging port to the electric energy storage device, the first charging port may not be provided with a lid. However, the present disclosure is not limited to this, and the first charging port may be provided with a lid.

The first charging port may include a contactless charging port. The control device may be configured to determine whether the predetermined charge prohibition condition is satisfied at a time when alignment of the contactless charging port for contactless charging is started or completed before charging of the electric energy storage device is started using the contactless charging port.

Hereinafter, the alignment of the contactless charging port for contactless charging is also referred to as "alignment before power transmission." When alignment before power transmission (e.g., alignment between a power transmitting coil and a power receiving coil) is performed, it is highly likely that charging will be performed using the contactless charging port.

The control device may request power supply equipment to transmit electric power in a contactless manner at a time when preparation for contactless power transmission to the contactless charging port is completed. The control device may determine whether the predetermined charge prohibition condition is satisfied immediately before requesting the power supply equipment to transmit electric power in a contactless manner.

The first charging port may include a charging port that receives alternating current power (hereinafter, also referred to as "AC port"). The AC-to-DC converter circuit and an insulation circuit may be present in the power path from the AC port to the electric energy storage device.

Since not only the AC-to-DC converter circuit but also the insulation circuit are present in the power path from the AC port to the electric energy storage device, a higher level of safety can be ensured for the AC port.

A vehicle according to a third aspect of the present disclosure includes any one of the charging systems described above. Since the vehicle includes any one of the charging systems described above, safety in the charging system can be improved by simple control.

The electric energy storage device in any one of the above charging systems may be configured to supply electric power for a vehicle to travel. The vehicle may be an electrically driven vehicle. Electrically driven vehicles are vehicles configured to run on the electric power stored in the electric energy storage device. Electrically driven vehicles include fuel cell vehicles (FC vehicles) and range extender electric vehicles (REEVs) in addition to electric vehicles (EVs) and plug-in hybrid vehicles (PHVs).

The vehicle may be a connected car. The amount of communication of the connected car is large. Accordingly, a malfunction is likely to occur if control is complicated.

A charge control device according to a fourth aspect of the present disclosure is configured to control a switch device configured to switch between connection and disconnection of each of power paths from a plurality of charging ports to an electric energy storage device. The charge control device is configured to determine whether a predetermined charge prohibition condition is satisfied before starting charging the electric energy storage device using any one of the charging ports, and when the predetermined charge prohibition condition is satisfied, keep each of the power paths from the charging ports to the electric energy storage device disconnected. The predetermined charge prohibition condition is satisfied when a lid of at least one charging port that is included in the charging ports and that is other than the charging port to be used is open.

Unless the lid of every unused port is closed, the charge control device keeps each of the power paths from the charging ports to the electric energy storage device disconnected and will not start charging. According to the above charge control device, safety in the charging system can be improved by simple control.

A charging method according to a fifth aspect of the present disclosure includes the following steps A to C. In step A, whether a predetermined charge prohibition condition is satisfied is determined by a control device before starting charging an electric energy storage device using any one of a plurality of charging ports. The predetermined charge prohibition condition is satisfied when a lid of at least one charging port that is included in the charging ports and that is other than the charging port to be used is open.

In step B, when the predetermined charge prohibition condition is satisfied, each of power paths from the charging ports to the electric energy storage device is disconnected by the control device so as not to start charging the electric energy storage device.

In step C, when the predetermined charge prohibition condition is not satisfied, the power path from the charging port to be used that is included in the charging ports to the electric energy storage device is connected by the control device to start charging the electric energy storage device.

In the above charging method, unless the lid of every unused port is closed, each of the power paths from the charging ports to the electric energy storage device is kept disconnected and charging will not be started. According to the above charging method, safety in the charging system can be improved by simple control.

According to the present disclosure, in a charging system that charges an electric energy storage device by electric power supplied to each of a plurality of charging ports, safety can be improved by simple control.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 14 illustrates an example of the configuration of a contactless charging system;

DETAILED DESCRIPTION OF EMBODIMENTS

Figure 1:
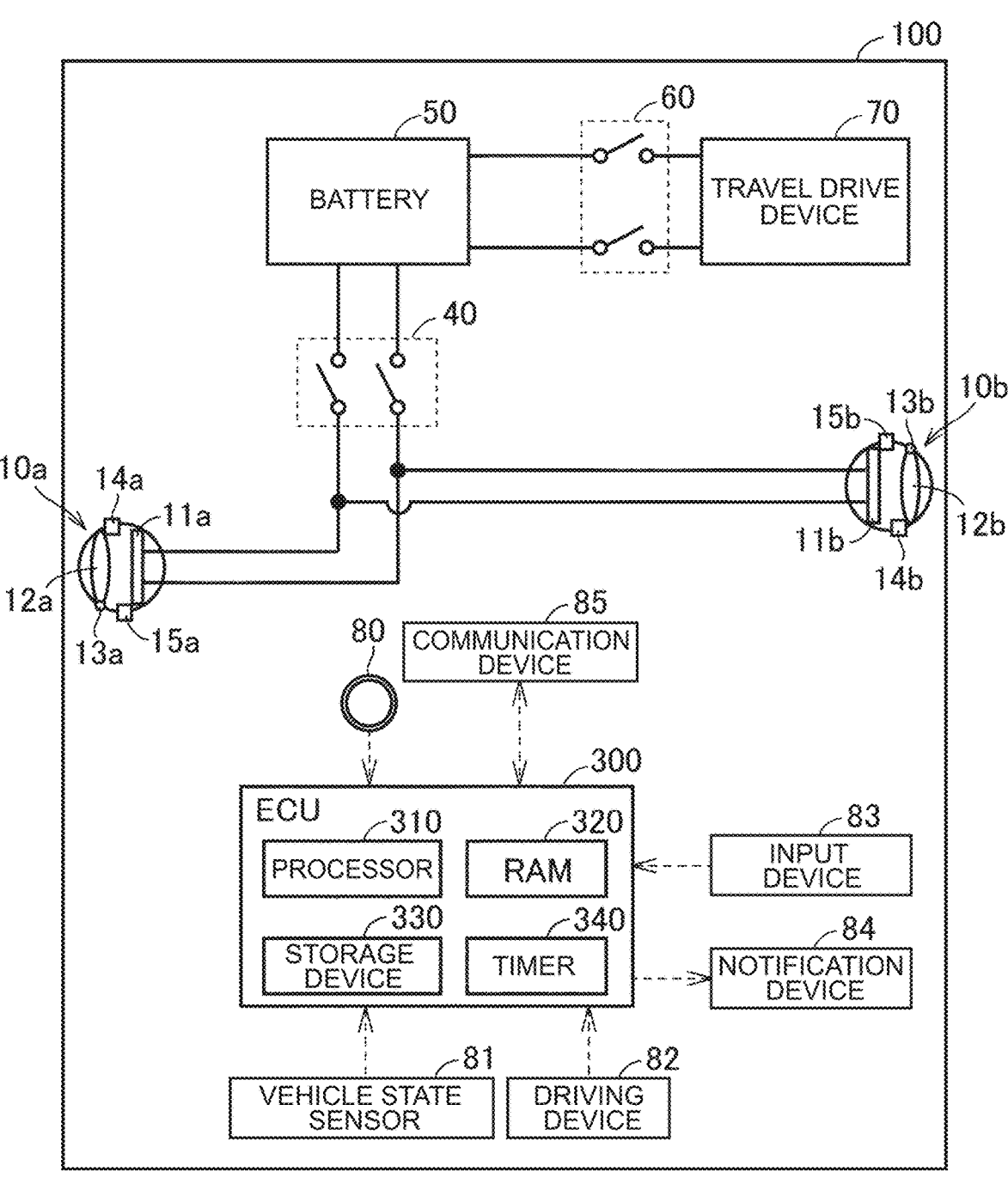
FIG. 1 illustrates a configuration of a vehicle according to an embodiment of the present disclosure.

An embodiment of the present disclosure will be described in detail with reference to the drawings. The same or corresponding parts in the drawings are denoted by the same signs and the description thereof will not be repeated. Hereinafter, an electronic control unit will be referred to as "ECU."

FIG. 1 illustrates a configuration of a vehicle according to the embodiment. Referring to FIG. 1, a vehicle 100 includes charging ports 10a, 10b, a charging relay 40, a battery 50, a system main relay (SMR) 60, a travel drive device 70, a start switch 80, a vehicle state sensor 81, a driving device 82, an input device 83, a notification device 84, a communication device 85, and an ECU 300.

The vehicle 100 according to the embodiment is an electric vehicle (EV). The battery 50 is configured to supply electric power for the vehicle 100 to travel to the travel drive device 70. The travel drive device 70 is configured to generate a traction force for the vehicle 100 using the electric power supplied from the battery 50. The configuration of the travel drive device 70 will be described in detail later. The SMR 60 is configured to connect and disconnect a power path from the battery 50 to the travel drive device 70. The battery 50, the charging relay 40, and the ECU 300 according to the embodiment are an example of the "electric energy storage device," the "switch device," and the "charge control device (control device)" according to the present disclosure, respectively.

A vehicle body of the vehicle 100 has the charging ports 10a, 10b. In the embodiment, the charging ports 10a, 10b are DC ports (i.e., charging ports that receive DC power). In the embodiment, the charging ports 10a, 10b are manual charging ports to which a connector of a charging cable is connected by a user. The battery 50 is configured so that the battery 50 can be charged with electric power supplied from the outside of the vehicle 100 to the charging ports 10a, 10b. The charging ports 10a, 10b include inlets 11a, 11b, lids 12a, 12b, open and close mechanisms 13a, 13b, open and close sensors 14a, 14b, and connection sensors 15a, 15b, respectively. Hereinafter, each of the charging ports 10a, 10b is referred to as the "charging port 10," each of the inlets 11a, 11b is referred to as the "inlet 11," each of the lids 12a, 12b is referred to as the "lid 12," each of the open and close mechanisms 13a, 13b is referred to as the "open and close mechanism 13," each of the open and close sensors 14a, 14b is referred to as the "open and close sensor 14," and each of the connection sensors 15a, 15b is referred to as the "connection sensor 15" unless individually identified.

The inlet 11 is configured so that a connector (not shown) of a charging cable connected to power supply equipment (not shown) installed outside the vehicle 100 can be connected to the inlet 11. The connector is connected to the inlet 11 by the user. The connection sensor 15 detects whether the connector is connected to the inlet 11, and outputs the detection result to the ECU 300. With the connector being connected to the inlet 11, electric power can be supplied from the power supply equipment to the inlet 11 through the charging cable.

The lid 12 is configured to open and close the charging port 10. The lid 12 is configured so that the lid 12 can open and close the charging port 10 as the lid 12 is connected to the vehicle body via the open and close mechanism 13 (e.g., a hinge). When the lid 12 is closed, the use of the inlet 11 is prohibited. When the lid 12 is open, the user is allowed to use the inlet 11 from the outside of the vehicle 100. The lid 12 is provided with the open and close sensor 14. The open and close sensor 14 is configured to detect whether the lid 12 is open or closed and output the detection result to the ECU 300. The open and close sensor 14 can be a courtesy switch. The charging port 10 may further include a lid lock device that locks and unlocks the lid 12 as instructed by the ECU 300. The charging port 10 may further include a connector lock device that regulates removal of the connector connected to the inlet 11.

The charging relay 40 is configured to connect and disconnect each of power paths from the charging ports 10a, 10b to the battery 50. When the charging relay 40 is open (disconnected state), each of power paths from the inlets 11a, 11b to the battery 50 is disconnected. When the charging relay 40 is closed (connected state), electric power can be supplied from each of the inlets 11a, 11b to the battery 50. The state (connected or disconnected state) of the charging relay 40 is controlled by the ECU 300.

As described above, in the vehicle 100 according to this embodiment, the battery 50 is configured to be externally chargeable. External charging in the vehicle 100 means charging the battery 50 with electric power supplied from the outside of the vehicle 100 to the inlet 11.

Figure 2:
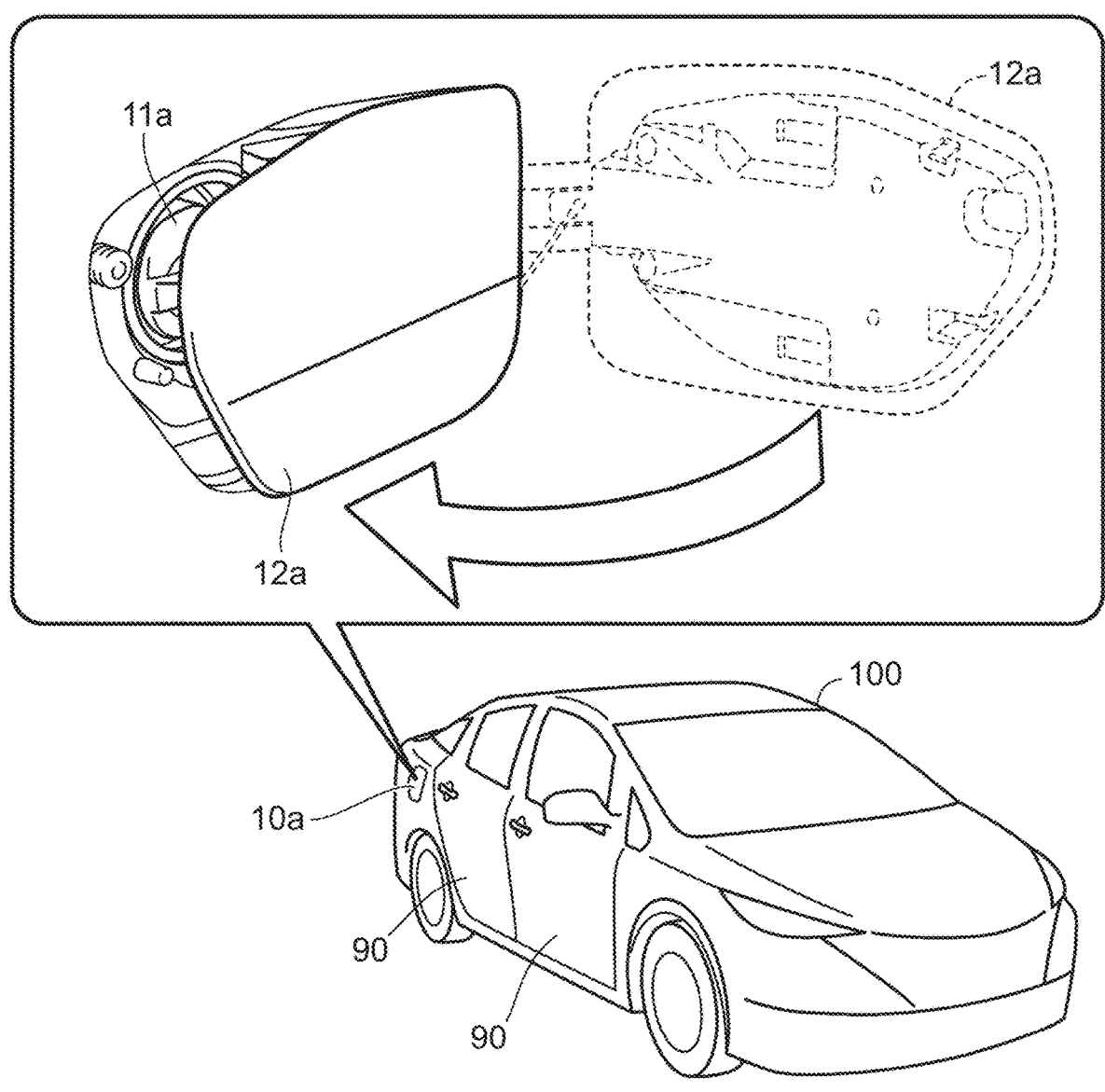
FIG. 2 illustrates the appearance of each of the vehicle and a charging port according to the embodiment of the present disclosure.

FIG. 2 illustrates the appearance of each of the vehicle 100 and the charging port 10a. Referring to FIG. 2 together with FIG. 1, the vehicle 100 includes four doors 90. The doors 90 are doors for getting into and out of the vehicle 100. Although only two doors 90 on the right side of the vehicle body are shown in FIG. 2, there are two more doors 90 on the left side of the vehicle body. In the embodiment, an open and close sensor that detects whether the door 90 is open or closed and a door lock device that locks and unlocks the door 90 (both not shown) are provided for each door 90.

In the embodiment, the vehicle 100 has the charging ports 10a, 10b on both rear sides of the vehicle body. Although only the charging port 10a on the right side of the vehicle body is shown in FIG. 2, there is the charging port 10b on the left side of the vehicle body. However, the present disclosure is not limited to this, and the charging ports 10a, 10b may be provided at any desired positions.

Referring back to FIG. 1, when the vehicle 100 travels, the SMR 60 is closed and electric power is supplied from the battery 50 to the travel drive device 70. The state of the SMR 60 is controlled by the ECU 300. For example, the SMR 60 can be an electromagnetic mechanical relay. When the SMR 60 is closed, electric power can be transferred between the battery 50 and the travel drive device 70. When the SMR 60 is open, a current is cut off by the SMR 60.

The travel drive device 70 includes a power control unit (PCU) and a motor generator (MG), both not shown. For example, the MG is a three-phase AC motor generator. The PCU includes a converter and an inverter that are controlled by the ECU 300. During power running of the MG, the PCU converts electric power stored in the battery 50 into AC power and supplies the AC power to the MG, and the MG rotates drive wheels of the vehicle 100 using the supplied AC power. During power generation by the MG (e.g., during regenerative braking), the PCU rectifies the generated power and supplies the rectified power to the battery 50.

The battery 50 includes a secondary battery such as, e.g., a lithium-ion battery or a nickel metal hydride battery and a monitoring unit that monitors the state of the battery 50 (both not shown). The secondary battery may be an assembled battery. Other electric energy storage device such as an electric double-layer capacitor may be used instead of the secondary battery. The voltage of the battery 50 may be 100 V or higher. In the embodiment, the voltage of the battery 50 is about 400 V. The monitoring unit includes various sensors that detect the state (e.g., temperature, current, and voltage) of the battery 50. The monitoring unit outputs the detection results of the sensors to the ECU 300. The monitoring unit may be a battery management system (BMS) that has a state of charge (SOC) estimation function, a state of health (SOH) estimation function, a cell voltage equalization function in the assembled battery, a diagnostic function, and a communication function in addition to the above sensor functions.

The ECU 300 includes a processor 310, a random access memory (RAM) 320, a storage device 330, and a timer 340. For example, the processor 310 can be a central processing unit (CPU). The RAM 320 functions as a working memory for temporarily storing data that is processed by the processor 310. The storage device 330 is configured to save stored information. The storage device 330 includes, e.g., a read-only memory (ROM) and a rewritable nonvolatile memory. The storage device 330 stores, in addition to a program, information that is used in the program (e.g., maps, mathematical expressions, and various parameters). In the embodiment, various controls in the ECU 300 are performed by the processor 310 executing the program stored in the storage device 330. The various controls in the ECU 300 need not necessarily be performed by software, and may be performed by dedicated hardware (electronic circuit). The ECU 300 may include any number of processors, and may have a processor for each predetermined control.

The timer 340 is configured to notify the processor 310 when a set time is reached. When the time set in the timer 340 is reached, the timer 340 sends a notification signal to the processor 310. In the embodiment, the timer 340 is a timer circuit. However, the timer 340 may be implemented by software instead of hardware (timer circuit).

The start switch 80 is a switch for starting a vehicle system. The vehicle system (including the ECU 300) is started by turning on the start switch 80. The start switch 80 is commonly referred to as the "power switch" or "ignition switch." In the embodiment, the vehicle system is started when the vehicle 100 is switched to a Ready-ON state, and the vehicle system is stopped (including a sleep state) when the vehicle 100 is switched to a Ready-OFF state. The Ready-ON state and the Ready-OFF state will be described below.

The vehicle 100 is switched to the Ready-ON state by the user pressing the start switch 80. In the Ready-ON state, the SMR 60 is closed and electric power is supplied from the battery 50 to the travel drive device 70. In the Ready-ON state, the ECU 300 can cause the vehicle 100 to travel by controlling the travel drive device 70. The vehicle 100 is switched to the Ready-OFF state by the user pressing the start switch 80 while the vehicle 100 is in the Ready-ON state. In the Ready-OFF state, the SMR 60 is opened and electric power is no longer supplied from the battery 50 to the travel drive device 70.

The vehicle state sensor 81 is a group of sensors that detects the state of the vehicle 100. In the embodiment, the vehicle state sensor 81 includes various sensors that monitor the environment of the vehicle 100 (e.g., outside temperature sensor, outside pressure sensor, and obstacle detector) and various sensors that monitor traveling of the vehicle 100 (e.g., vehicle speed sensor, position sensor, steering angle sensor, and odometer).

The driving device 82 is a device that accepts driving operations of the vehicle 100 performed by the user (e.g., operations related to changing gears, accelerator, brake, steering, and making the vehicle 100 stationary). The driving device 82 outputs signals corresponding to the driving operations by the user to the ECU 300. The ECU 300 controls traveling of the vehicle 100 based on the signals received from the driving device 82. In the embodiment, the driving device 82 includes a shift lever, an accelerator pedal, a brake pedal, a steering wheel, and a parking brake.

The input device 83 is a device that accepts an input made by the user other than the driving operations. The input device 83 outputs a signal corresponding to the user's input to the ECU 300. The user can gives a predetermined instruction, make a predetermined request, or set a parameter value through the input device 83. The communication method may be either wired or wireless. Examples of the input device 83 include various switches, various pointing devices, a keyboard, and a touch panel. The input device 83 may include a smart speaker that accepts voice input. The input device 83 may be an operation unit of a car navigation system.

The notification device 84 is configured to execute a predetermined notification process when requested by the ECU 300. Examples of the notification device 84 include a display device (e.g., meter panel or head-up display), a speaker, and a lamp. The notification device 84 may be a display unit of a car navigation system.

The communication device 85 includes various communication interfaces (I/Fs). The communication device 85 may include a Data Communication Module (DCM). The communication device 85 may include a communication I/F compatible with a fifth generation mobile communication system (5G). The communication device 85 may include a communication I/F for wireless communication with a mobile terminal such as a smartphone, wearable device, or electronic key. The ECU 300 is configured to wirelessly communicate with a communication device outside the vehicle 100 through the communication device 85. The vehicle 100 may be a connected car.

Figure 3:
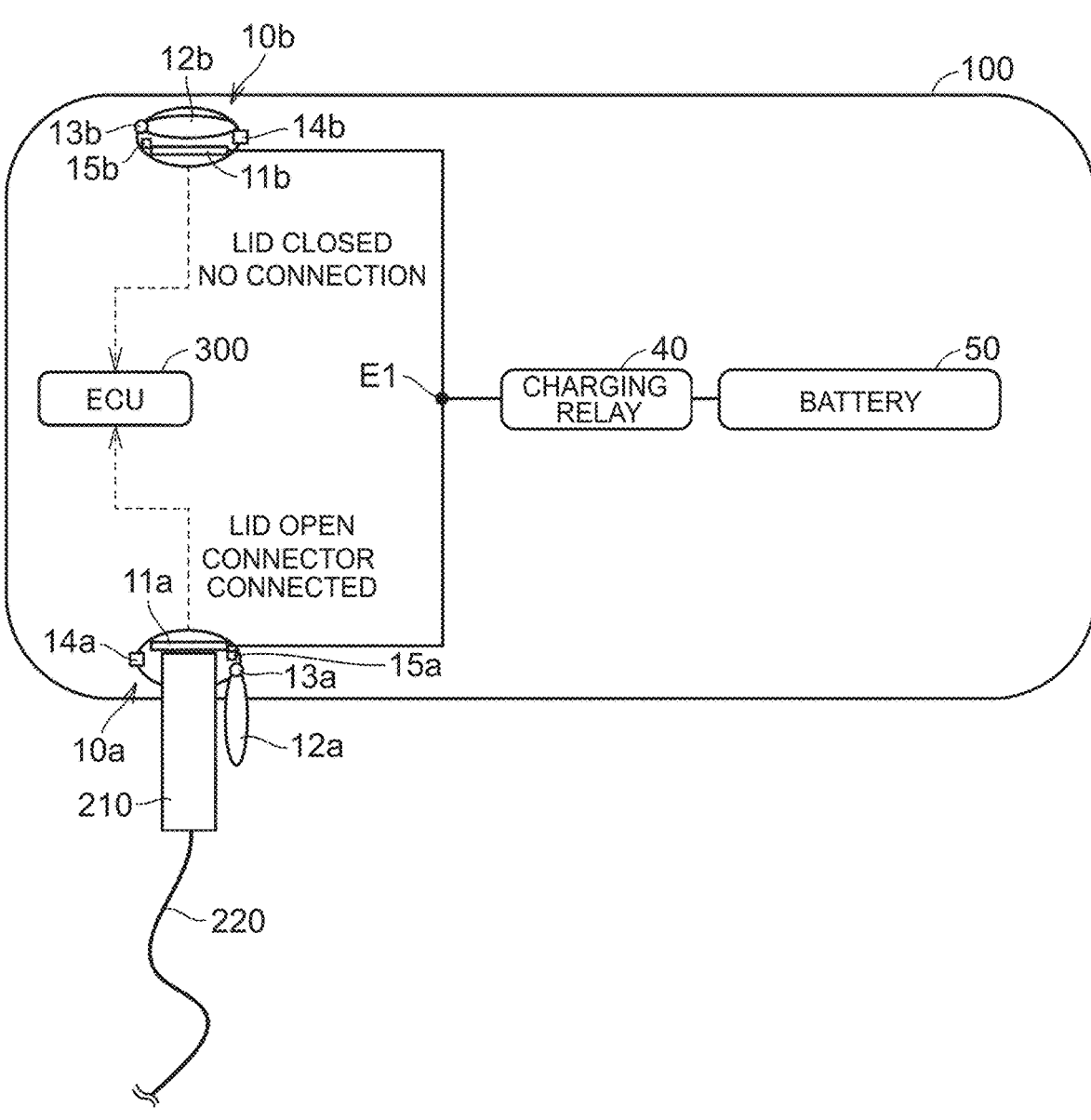
FIG. 3 illustrates a charging system mounted on the vehicle according to the embodiment of the present disclosure.

FIG. 3 illustrates a charging system mounted on the vehicle 100 according to the embodiment. Referring to FIG. 3 together with FIG. 1, in this charging system, a wire connected to the inlet 11a and a wire connected to the inlet 11b are connected to each other by a connection portion E1. The connection portion E1 is electrically connected to the battery 50 via the charging relay 40. A power path from the connection portion E1 to the battery 50 is a common part of the power paths from the charging ports 10a, 10b to the battery 50. The charging relay 40 is disposed between the connection portion E1 and the battery 50 and is configured to connect and disconnect the common part. For example, the charging relay 40 can be an electromagnetic mechanical relay. In the embodiment, the charging relay 40 is a normally-off switch. The charging relay 40 is open (disconnected state) when not energized.

In the example shown in FIG. 3, the lid 12*a* of the charging port 10*a* is open and a connector 210 of a charging cable 220 is connected to the inlet 11*a*. The connector 210 according to the embodiment is an example of the "charging connector" according to the present disclosure. The charging cable 220 is connected to power supply equipment, not shown (more specifically, DC power supply equipment that supplies DC power). The lid 12*b* of the charging port 10*b* is closed. The ECU 300 detects the "lid open" and the "connector connected" regarding the charging port 10*a* based on signals output from the open and close sensor 14*a* and the connection sensor 15*a*. The ECU 300 detects the "lid closed" and "no connection" regarding the charging port 10*b* based on signals output from the open and close sensor 14*b* and the connection sensor 15*b*. When the ECU 300 closes the charging relay 40 in the state shown in FIG. 3, the battery 50 is charged with DC power supplied from the DC power supply equipment to the inlet 11*a*.

In the example shown in FIG. 3, the charging port 10*a* is a used port (i.e., a used charging port), and the charging port 10*b* is an unused port (i.e., a charging port other than the used charging port). Hereinafter, the process of switching the charging relay 40 from the open state to the closed state is also referred to as "charging relay ON." The process of switching the charging relay 40 from the closed state to the open state is also referred to as "charging relay OFF."

Figure 4:
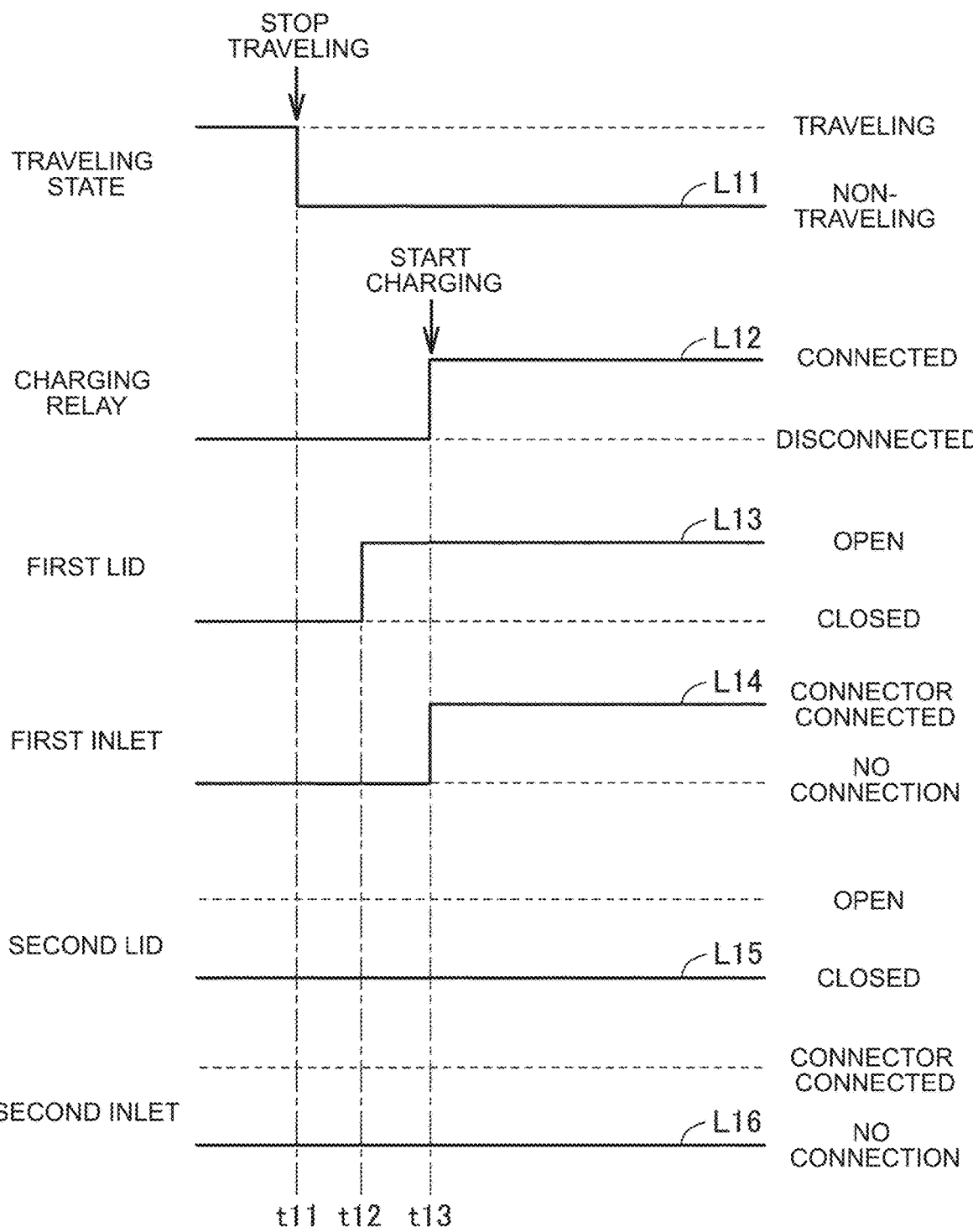
FIG. 4 is a timing chart illustrating a first example of the operation of the vehicle according to the embodiment of the present disclosure.

FIG. 4 is a timing chart illustrating a first example of the operation of the vehicle 100 according to the embodiment. In FIG. 4, lines L11, L12 show a change in traveling state (traveling or non-traveling) of the vehicle 100 and state (connected or disconnected) of the charging relay 40, respectively. In FIG. 4, the first lid and the second lid mean the lids 12*a*, 12*b*, respectively, and lines L13, L15 show a change in state (open or closed) of the lids 12*a*, 12*b*, respectively. In FIG. 4, the first inlet and the second inlet mean the inlets 11*a*, 11*b*, respectively, and lines L14, L16 show a change in state (connector connected or no connection) of the inlets 11*a*, 11*b*, respectively.

In the example shown in FIG. 4, both lids 12*a*, 12*b* are closed while the vehicle 100 is traveling (see lines L13, L15). After the user parks the vehicle 100 so that the charging port 10*a* is located near the DC power supply equipment, the user operates the start switch 80 to switch the vehicle 100 to the Ready-OFF state. As a result, the vehicle 100 is switched to the non-traveling state (i.e., the state in which the vehicle 100 cannot be electrically powered to travel). In the example shown in FIG. 4, the vehicle 100 is switched from the traveling state to the non-traveling state at time t11 (see line L11).

The user then opens the lid 12*a* at time t12 (line L13) and connects the connector of the charging cable connected to the DC power supply equipment to the inlet 11*a* at time t13 (line L14). The ECU 300 executes the charging relay ON when the connector of the charging cable is connected to the inlet 11*a*. As a result, the charging relay 40 is closed (connected) (line L12), and charging of the battery 50 is started.

In the example shown in FIG. 4, the lid of the unused port (i.e., the charging port 10*b* to which the charging connector is not connected) is closed when the charging connector (i.e., the connector of the charging cable) is connected to the inlet 11*a*. In this case, the ECU 300 executes the charging relay ON. However, in the case where the lid of the unused port is open, the ECU 300 does not execute the charging relay ON. Hereinafter, effects produced by this control will be described in comparison with control according to a comparative example.

Figure 5:
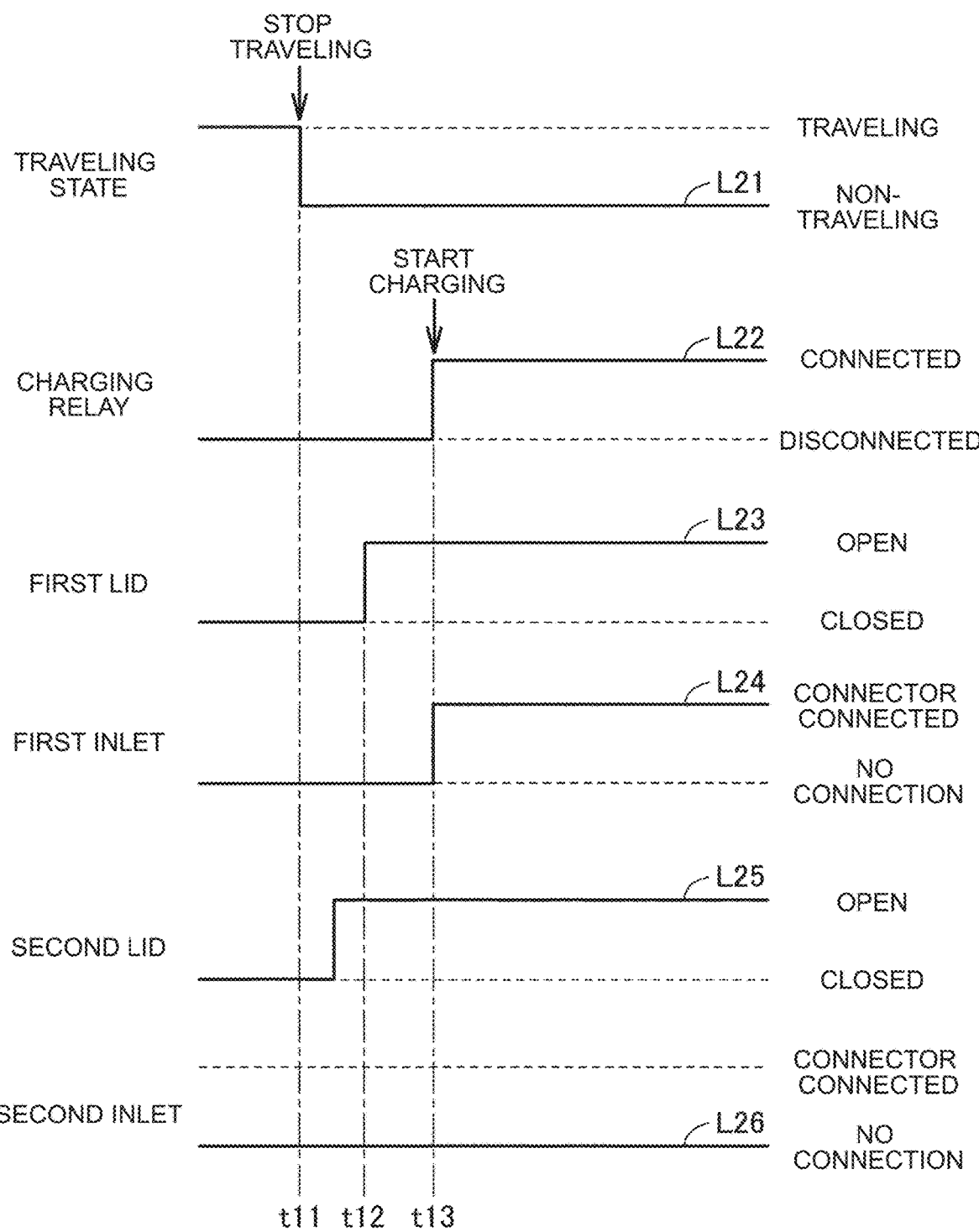
FIG. 5 is a timing chart illustrating control according to a comparative example.

FIG. 5 is a timing chart illustrating the control according to the comparative example. In the control according to the comparative example, the charging relay ON is executed even in the case where the lid of the unused port is open when the charging connector is connected to the inlet 11*a* or the inlet 11*b*. Lines L21 to L26 in FIG. 5 correspond to lines L11 to L16 in FIG. 4, respectively.

In the example shown in FIG. 5, the user mistakenly opened the lid 12*b* between time t11 and time t12 (i.e., after the vehicle was stopped and before the lid 12*a* was opened) and forgot to close the lid 12*b* (see line L25). The lid 12*b* of the charging port 10*b* (unused port) is therefore open at time t13 when the charging connector is connected to the inlet 11*a* of the charging port 10*a* (used port) (line L25). In the control according to the comparative example, the charging relay 40 is closed (connected) at time t13 (line L22). As a result, the voltage of the battery 50 is applied to the inlet 11*b* of the charging port 10*b* (unused port). The level of safety in the charging system is therefore low.

Referring back to FIG. 3, in the embodiment, the ECU 300 determines whether a predetermined charge prohibition condition (hereinafter, also simply referred to as the "prohibition condition") is satisfied, before charging of the battery 50 is started using the charging port 10*a* or 10*b*. The prohibition condition is satisfied when the lid of the unused port is open. In the embodiment, the ECU 300 determines whether the prohibition condition is satisfied at the time when the charging connector is connected to the charging port 10*a* or 10*b*.

When the ECU 300 determines that the prohibition condition is satisfied, the ECU 300 opens (disconnects) the charging relay 40 so as not to start charging the battery 50. When the charging relay 40 is open, the power paths from the charging ports 10*a*, 10*b* to the battery 50 are disconnected. As a result, the voltage of the battery 50 is no longer applied to the inlets 11*a*, 11*b*.

On the other hand, when the ECU 300 determines that the prohibition condition is not satisfied, the ECU 300 closes (connects) the charging relay 40 to start charging the battery 50. When the charging relay 40 is closed, the power path from the used port (i.e., the charging port 10 to which the charging connector is connected) to the battery 50 is connected. As a result, electric power supplied from the DC power supply equipment to the used port is input to the battery 50 via the charging relay 40.

Figure 6:
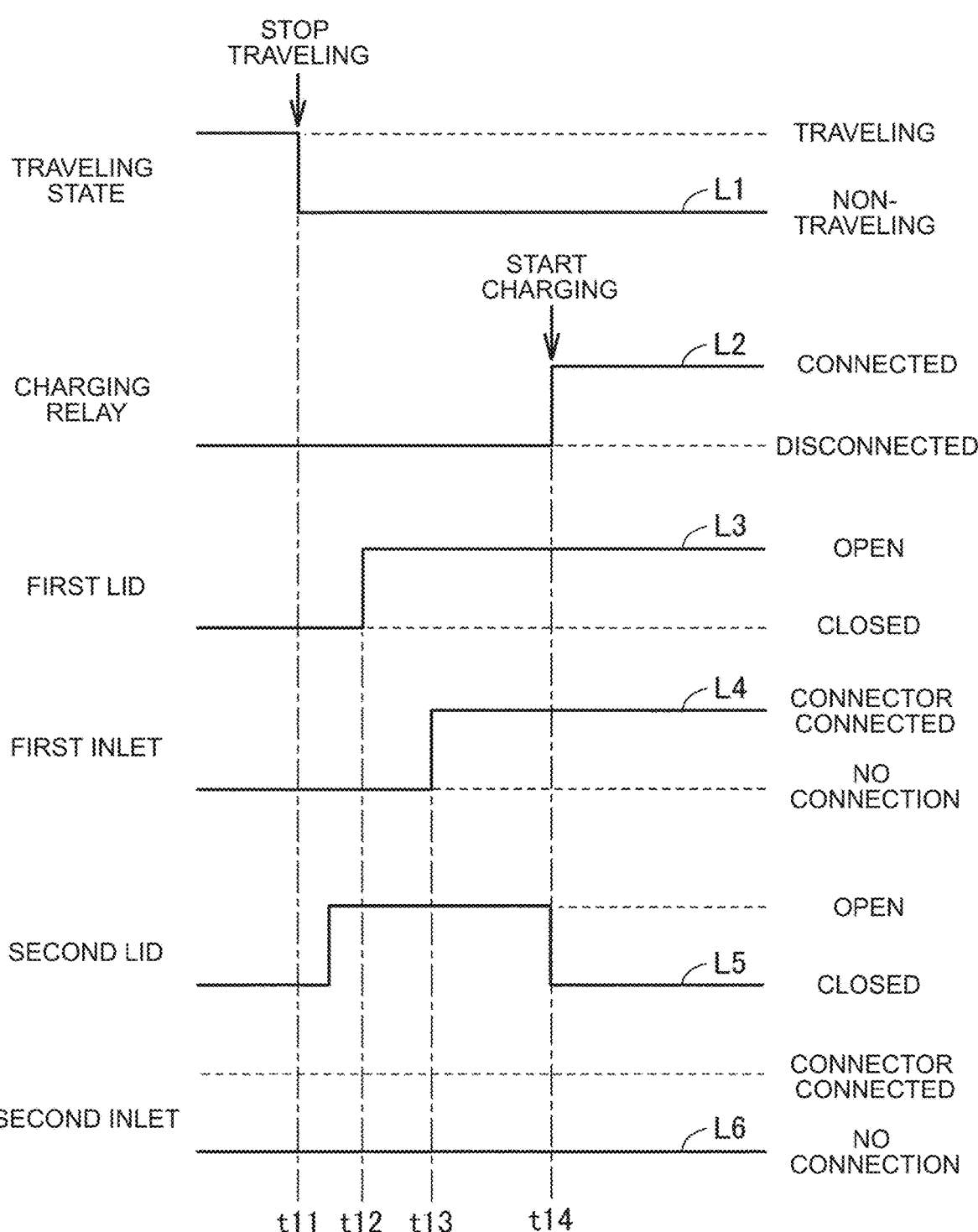
FIG. 6 is a timing chart illustrating a second example of the operation of the vehicle according to the embodiment of the present disclosure.

Hereinafter, the control according to the embodiment will be described with reference to FIG. 6 together with FIG. 1. FIG. 6 is a timing chart illustrating a second example of the operation of the vehicle 100 according to the embodiment. Lines L1 to L6 in FIG. 6 correspond to lines L11 to L16 in FIG. 4, respectively.

In the example shown in FIG. 6 as well, the user mistakenly opened the lid 12*b* of the charging port 10*b* (unused port) between time t11 and time t12 (i.e., after the vehicle 100 was stopped and before the lid 12*a* was opened) and forgot to close the lid 12*b* (see line L5), as in the example shown in FIG. 5. The user connects the charging connector to the charging port 10*a* (used port) at time t13 when the lid 12*b* of the charging port 10*b* (unused port) is open. However, the ECU 300 does not execute the charging relay ON at time t13. The ECU 300 executes the charging relay ON (line L2) when the user subsequently closes the lid 12*b* at time t14

(line L5). As a result, the charging relay 40 is closed (connected), and charging of the battery 50 is started.

As described above, in the control according to the embodiment, the prohibition condition is satisfied when the lid of the unused port is open. When the prohibition condition is satisfied, the power paths from the charging ports 10a, 10b to the battery 50 are kept disconnected. Charging of the battery 50 will not be started unless the lid of the unused port is closed. When the lid of the unused port is closed, the ECU 300 starts charging the battery 50 by executing the charging relay ON. As the charging relay 40 is closed, the voltage of the battery 50 is applied to both the used port and the unused port. However, it is safe as the lid of the unused port is closed. As the inlet is covered by the lid of the unused port, the user is physically prohibited from touching the inlet of the unused port. In the above control, only one charging relay 40 is controlled to connect or disconnect the power paths. The control of the charging system according to the embodiment is simple. As described above, according to the above control, safety in the charging system can be improved by simple control.

Figure 7:
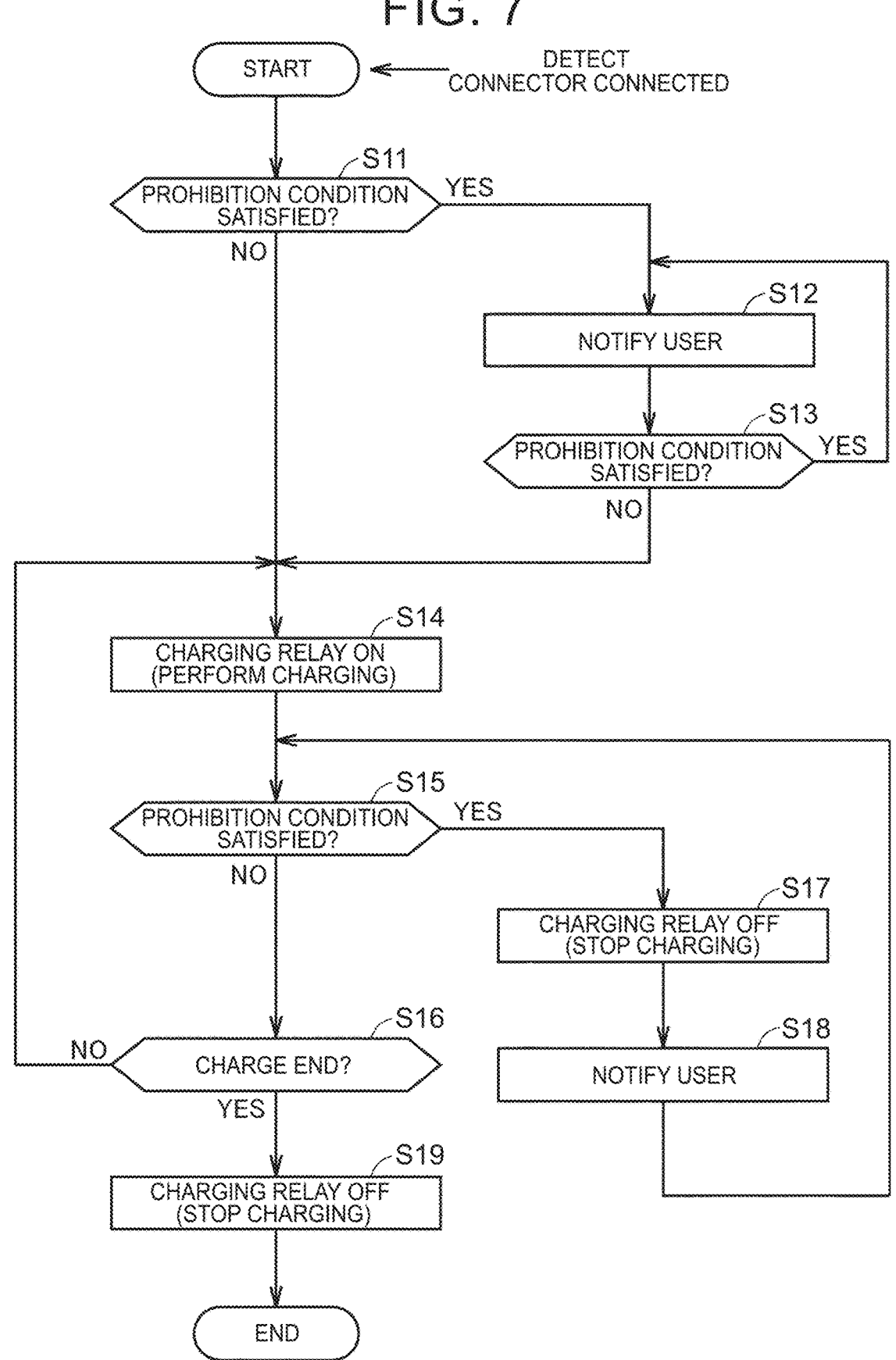
FIG. 7 is a flowchart illustrating charge control according to the embodiment of the present disclosure.

FIG. 7 is a flowchart of charge control according to the embodiment. The ECU 300 executes the process shown in this flowchart when the charging connector is connected to either the charging port 10a or the charging port 10b. The ECU 300 can detect the connector connected, based on signals output from the connection sensors 15a, 15b.

Figure 8:
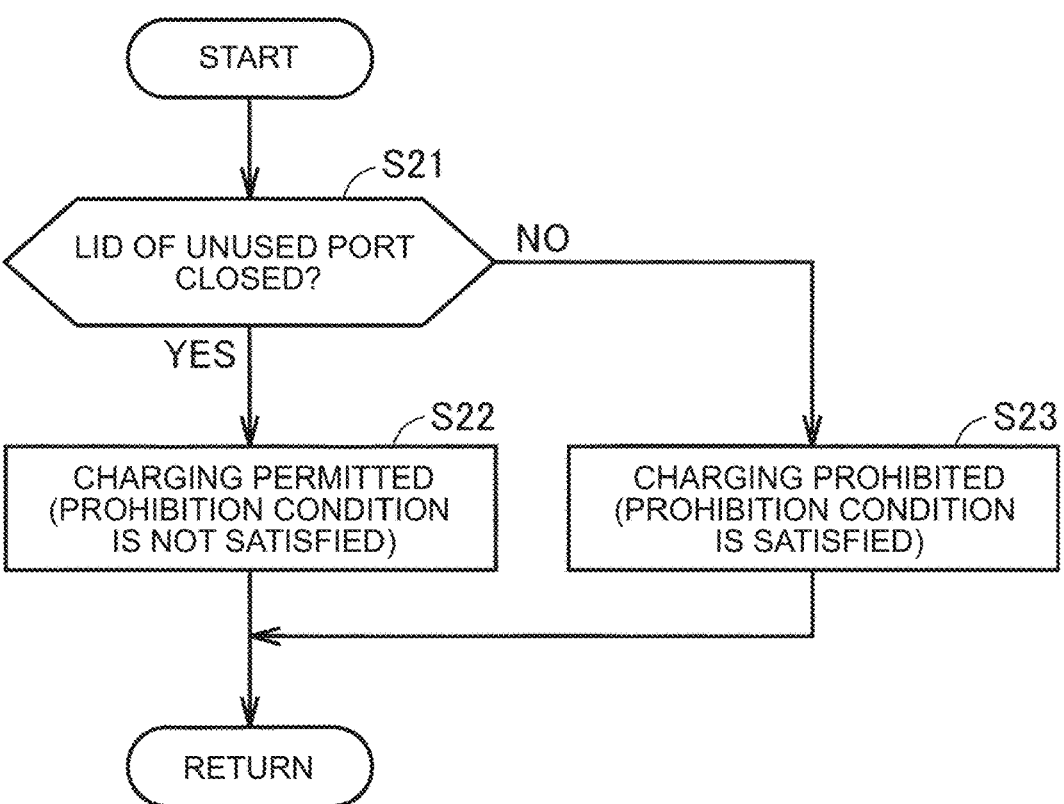
FIG. 8 is a flowchart illustrating in detail determination of whether a predetermined charge prohibition condition is satisfied in the process shown in FIG. 7.

Referring to FIG. 7 together with FIG. 1, in step (hereinafter abbreviated as "S") 11, the ECU 300 determines whether the prohibition condition is satisfied. The ECU 300 determines whether the prohibition condition is satisfied by executing, e.g., a process shown in FIG. 8 described below. FIG. 8 is a flowchart illustrating the details of S11 of FIG. 7.

Referring to FIG. 8 together with FIG. 1, in S21, the ECU 300 determines whether the lid of the unused port (i.e., the charging port 10 to which the charging connector is not connected) is closed. For example, in the case where the used port is the charging port 10a (i.e., in the case where charging connector is connected to the inlet 11a), the ECU 300 determines whether the lid 12b is closed. The ECU 300 can detect the state (open or closed) of the lid based on signals output from the open and close sensors 14a, 14b.

When the lid of the unused port is closed (YES in S21), the ECU 300 determines in S22 that the prohibition condition is not satisfied (i.e., NO in S11 of FIG. 7). The prohibition condition being not satisfied means that charging is permitted.

When the lid of the unused port is open (NO in S21), the ECU 300 determines in S23 that the prohibition condition is satisfied (i.e., YES in S11 of FIG. 7). The prohibition condition being satisfied means that charging is prohibited.

Referring to FIG. 7 together with FIG. 1, when YES (prohibition condition is satisfied) in S11, the routine proceeds to S12. In S12, the ECU 300 controls the notification device 84 to notify the user that the prohibition condition is satisfied. For example, the notification device 84 displays a screen that prompts the user to cause the prohibition condition not to be satisfied.

Figure 9:
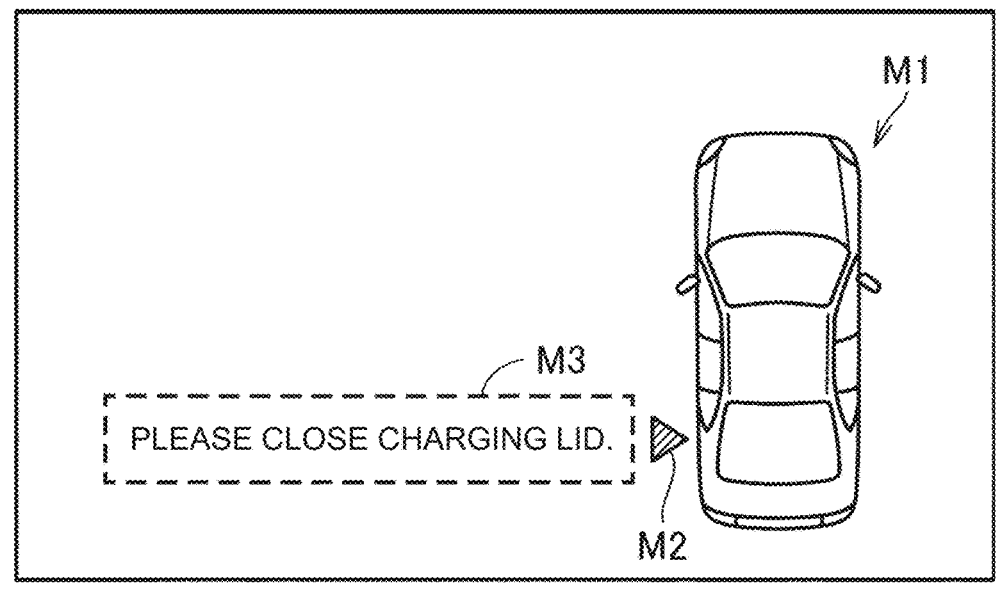
FIG. 9 illustrates an example of a screen (notification screen) displayed by a notification device in the process of FIG. 7.

FIG. 9 illustrates an example of a screen (notification screen) displayed by the notification device 84 in S12 of FIG. 7. Referring to FIG. 9, this screen displays an image M1 of the entire vehicle 100, a mark M2 indicating the position of the unused port with an open lid, and a message M3 prompting the user to close the lid of the unused port. It is not essential to indicate the position of the unused port with an open lid by the above notification, and only the message M3 may be displayed. It is not essential to prompt the user to close the lid of the unused port. The user may just be notified by a message such as "there is an open charging port" that there is an unused port with an open lid. Any notification method may be used. The user may be notified by display (e.g., display of characters or an image) on a display device, by sound (including voice) from a speaker, or by turning on (including flashing) a predetermined lamp.

Referring back to FIG. 7 together with FIG. 1, in S13, the ECU 300 determines whether the prohibition condition is satisfied by executing, e.g., the process shown in FIGS. 8. S12 and S13 are repeated as long as the determination result in S13 is YES (prohibition condition is satisfied). For example, the determination result in S13 becomes NO when the user closes the lid of the unused port.

When the prohibition condition is not satisfied (NO in S11 or S13), the routine proceeds to S14. In S14, the ECU 300 closes (connects) the charging relay 40. When starting charging, the ECU 300 requests the power supply equipment to transmit electric power, and executes the charging relay ON. As a result, charging of the battery 50 is started. For example, in the case where the charging connector is connected to the inlet 11a, electric power supplied from the DC power supply equipment to the inlet 11a through the charging cable is input to the battery 50 via the charging relay 40.

After S14, the ECU 300 determines in S15 whether prohibition condition is satisfied by executing, e.g., the process shown in FIG. 8. Since the prohibition condition is not satisfied at the start of charging, the determination result in S15 is NO (prohibition condition is not satisfied), and the routine proceeds to S16. In S16, the ECU 300 determines whether a predetermined charge end condition (hereinafter, also simply referred to as "end condition") is satisfied. The end condition may be satisfied when the SOC of the battery 50 becomes equal to or higher than a predetermined SOC value (e.g., an SOC value indicating full charge). When the end condition is not satisfied (NO in S16), the routine returns to S14 and charging of the battery 50 is continued. The ECU 300 determines whether the prohibition condition is satisfied while charging the battery 50 (S15).

When YES (prohibition condition is satisfied) in S15, the routine proceeds to S17. In S17, the ECU 300 opens (disconnects) the charging relay 40. When stopping charging, the ECU 300 requests the power supply equipment to stop transmitting electric power, and executes the charging relay OFF. As a result, charging of the battery 50 is stopped. Thereafter, in S18, the ECU 300 notifies the user that the prohibition condition is satisfied by executing, e.g., a process similar to that of S12 described above. The routine then returns to S15. As long as the determination result in S15 is YES (prohibition condition is satisfied), S15, S17, and S18 are repeated and the charging relay 40 is kept open. For example, the determination result in S15 becomes NO (prohibition condition is not satisfied) when the user closes the lid of the unused port. When NO in S15, the routine proceeds to S14 via S16. In S14, the charging relay 40 is closed, and charging of the battery 50 is resumed.

As the charging of the battery 50 progresses and the end condition is satisfied (YES in S16), the routine proceeds to S19. In S19, the ECU 300 requests the power supply equipment to stop transmitting electric power, and executes the charging relay OFF. As a result, the charging relay 40 is opened, and the charging of the battery 50 is stopped. The series of steps shown in FIG. 7 is completed by performing S19.

As described above, in the charging system according to the embodiment, in the case where the lid of the unused port is open before charging of the battery 50 is started using the charging port 10*a* or 10*b*, the ECU 300 opens (disconnects) the charging relay 40 so as not to start charging the battery 50. As a result, when the lid of the unused port is open, the voltage of the battery 50 is not applied to the inlets 11*a*, 11*b*. When the lid of the unused port is closed, the ECU 300 starts charging the battery 50 by executing the charging relay ON. As the inlet is covered by the lid of the unused port, the user is physically prohibited from touching the inlet of the unused port. With the ECU 300 (charge control device) according to the embodiment, safety in the charging system can be improved by simple control.

In the above embodiment, the ECU 300 determines whether the prohibition condition is satisfied while charging the battery 50. When the ECU 300 determines that the prohibition condition is satisfied, the ECU 300 opens the power paths from the inlets 11*a*, 11*b* to the battery 50 to stop charging the battery 50. However, it is not essential to determine whether the prohibition condition is satisfied while charging the battery 50. In the process shown in FIG. 7, S15, S17, and S18 may be omitted.

The prohibition condition (predetermined charge prohibition condition) need only be satisfied when the lid of the unused port is open, and is not limited to the condition that is determined to be satisfied or not satisfied by the process shown in FIG. 8. For example, the ECU 300 may execute a process shown in FIG. 10 described below instead of the process shown in FIG. 8.

Figure 10:
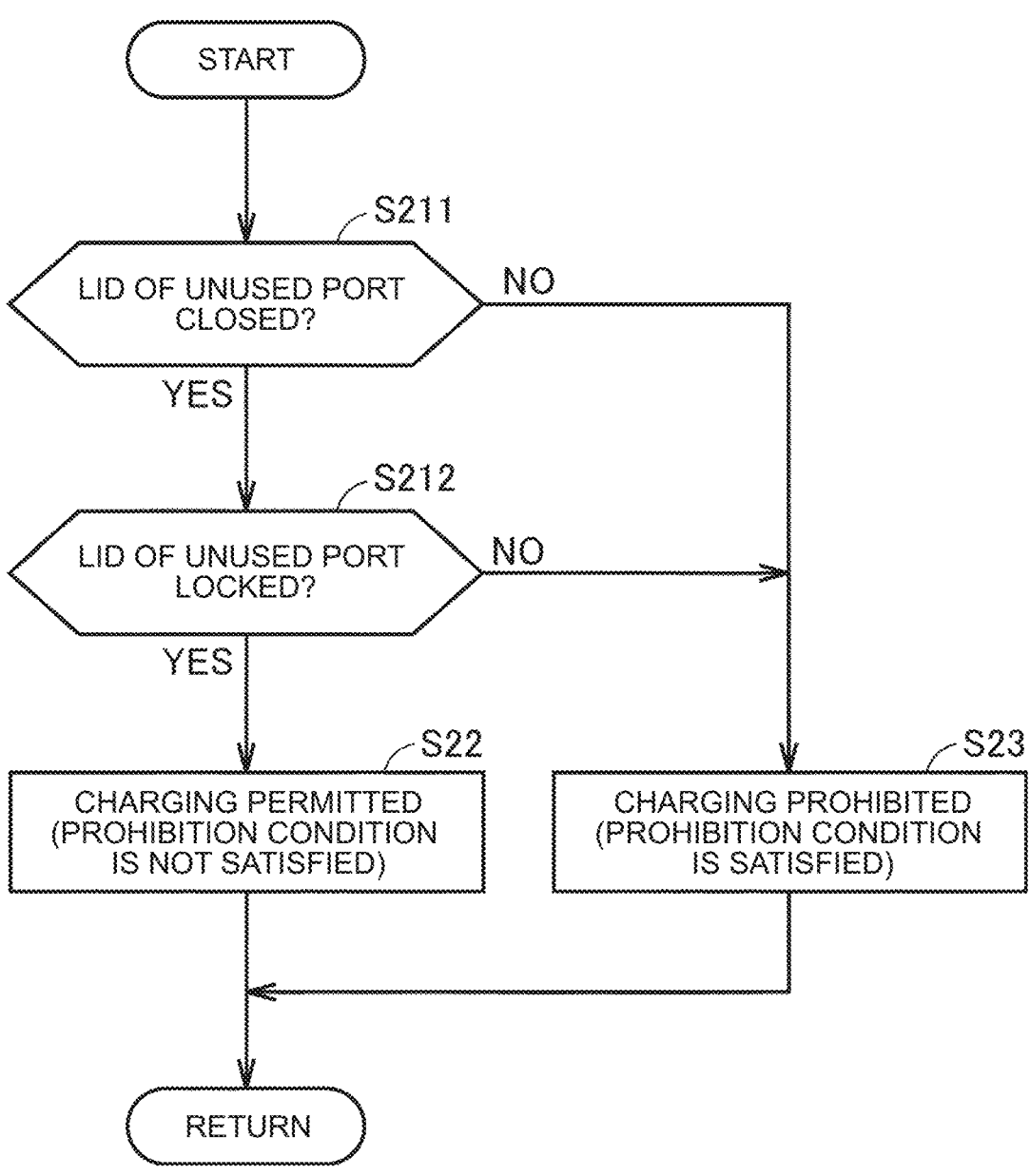
FIG. 10 is a flowchart illustrating a modification of the predetermined charge prohibition condition shown in FIG. 8.

FIG. 10 is a flowchart showing a modification of the prohibition condition. Referring to FIG. 10 together with FIG. 1, in S211, the ECU 300 determines whether the lid of the unused port (i.e., the charging port 10 to which the charging connector is not connected) is closed.

When the lid of the unused port is closed (YES in S211), the ECU 300 determines in S212 whether the lid of the unused port is locked.

When the lid of the unused port is closed and locked (YES in S211 and S212), the ECU 300 determines in S22 that the prohibition condition is not satisfied. When NO in S211 or S212, the ECU 300 determines in S23 that the prohibition condition is satisfied.

The prohibition condition (predetermined charge prohibition condition) that is determined to be satisfied or not satisfied in each of S11, S13, and S15 in FIG. 7 does not have to be the same. For example, the ECU 300 may execute the process shown in FIG. 8 in each of S11 and S15 of FIG. 7, and may execute the process shown in FIG. 10 in S13 of FIG. 7. In the process shown in FIG. 7, the notification step of S12 and the notification step of S18 may be different from each other.

Figure 11:
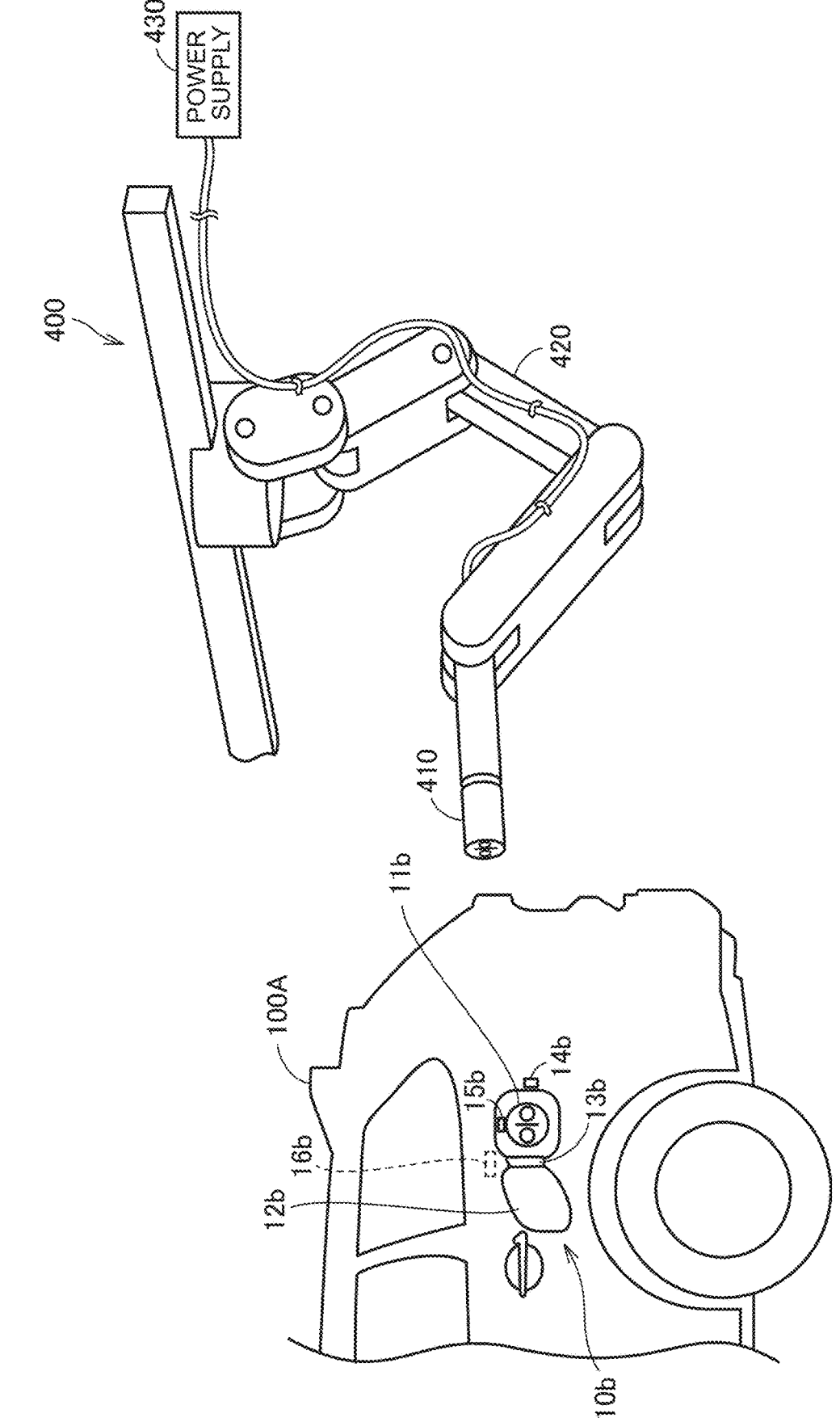
FIG. 11 illustrates a modification in which one of two charging ports shown in FIG. 1 is an automatic charging port.

In the embodiment, the charging ports 10*a*, 10*b* are manual charging ports to which the charging connector is connected by the user. However, the present disclosure is not limited to this, and at least one of the charging ports 10*a*, 10*b* may be an automatic charging port to which the charging connector is automatically connected. FIG. 11 illustrates a modification in which, of the charging ports 10*a*, 10*b* in the vehicle shown in FIGS. 1 to 3, the charging port 10*b* is an automatic charging port.

Referring to FIG. 11, a vehicle 100A according to the modification basically has the same configuration as the vehicle 100 shown in FIGS. 1 to 3. However, the charging port 10*a* of the vehicle 100A is a manual charging port, and the charging port 10*b* of the vehicle 100A is an automatic charging port. The charging port 10*b* of the vehicle 100A further includes an actuator 16*b* in addition to the inlet 11*b*, the lid 12*b*, the open and close mechanism 13*b*, the open and close sensor 14*b*, and the connection sensor 15*b*. The actuator 16*b* is configured to drive the open and close mechanism 13*b* to open and close the lid 12*b*. The actuator 16*b* is controlled by the ECU 300.

A robot 400 includes a charging connector 410, an arm 420, and a power supply 430. The charging connector 410 is located at the tip of the arm 420. The power supply 430 supplies electric power to the charging connector 410. When the ECU 300 controls the actuator 16*b* to open the lid 12*b* and then sends a power transmission request to the robot 400, the robot 400 moves the arm 420 to connect the charging connector 410 to the inlet 11*b* of the vehicle 100A. As the charging connector 410 is connected to the inlet 11*b*, electric power is supplied from the power supply 430 to the inlet 11*b*. The vehicle 100A can charge the battery 50 with the electric power supplied to the inlet 11*b*.

Since the vehicle 100A includes both a manual charging port and an automatic charging port, the battery 50 can be charged by both manual charging and automatic charging. In this vehicle 100A as well, the charging system shown in FIG. 3 is used and the ECU 300 executes the processes shown in FIGS. 7 and 8. Safety in the charging system can thus be improved by simple control.

Figure 12:
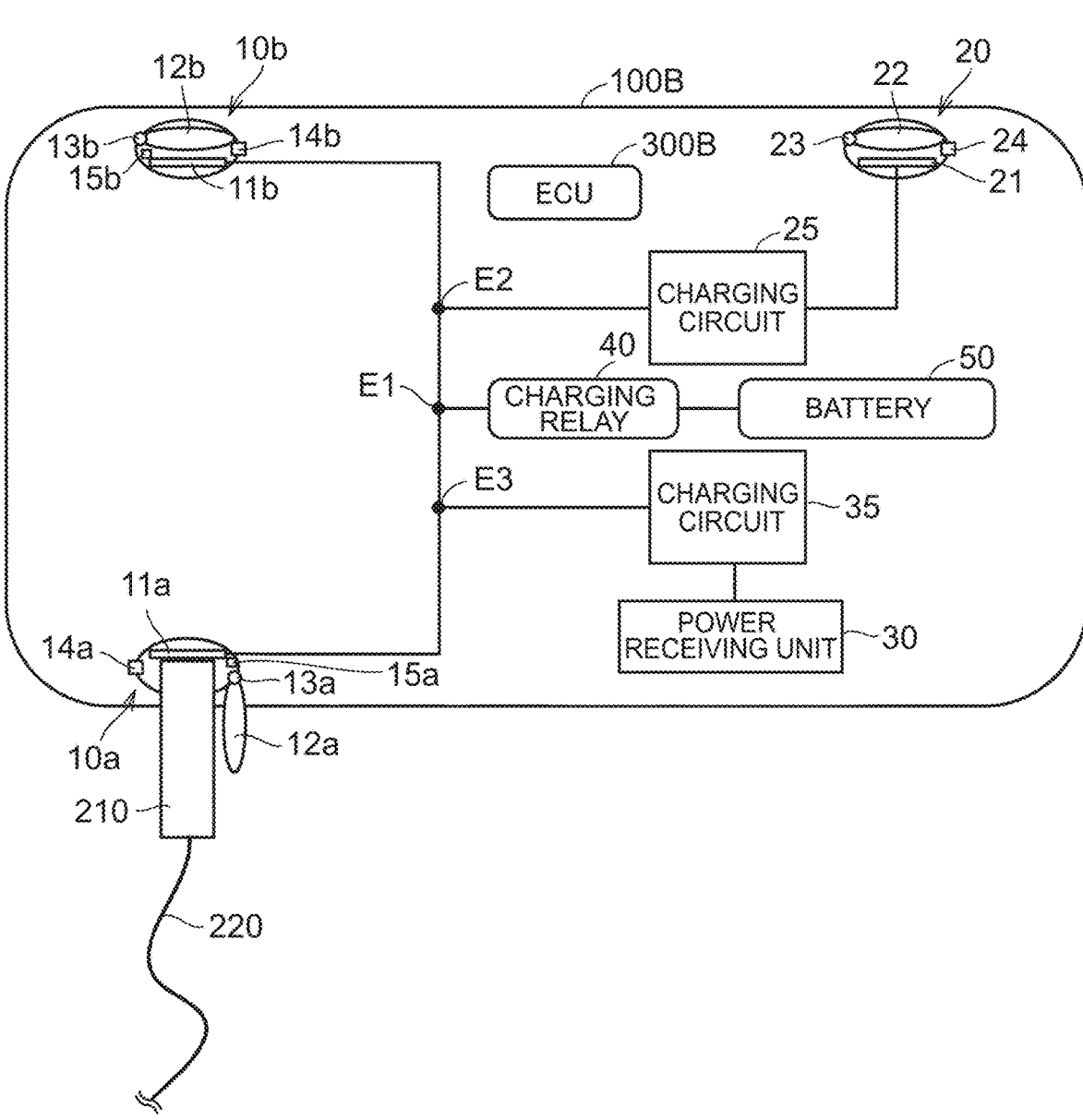
FIG. 12 illustrates a modification of the charging system shown in FIG. 3.

FIG. 12 illustrates a modification of the charging system shown in FIG. 3. Referring to FIG. 12, a vehicle 100B is equipped with a charging system that further includes a charging port 20 and a power receiving unit 30 in addition to the charging ports 10*a*, 10*b*. This charging system includes an ECU 300B instead of the ECU 300. The ECU 300B basically has functions similar to those of the ECU 300 according to the above embodiment. Hereinafter, functions of the ECU 300B that are different from those of the ECU 300 will be described.

The charging port 20 includes an inlet 21, a lid 22, an open and close mechanism 23, and an open and close sensor 24. The charging port 20 is an AC port that receives AC power. A connector of a charging cable connected to AC power supply equipment, not shown (i.e., equipment that supplies AC power) is connected to the inlet 21. The ECU 300B detects whether the charging connector is connected to or disconnected from the inlet 21, based on a cable connection signal output from the AC power supply equipment. Examples of the cable connection signal include a control pilot signal (CPLT signal) and a Proximity signal.

There is a charging circuit 25 in a power path from the charging port 20 to the battery 50. The charging circuit 25 is configured to convert electric power supplied from the AC power supply equipment to the charging port 20 into electric power suitable for charging the battery 50.

Figure 13:
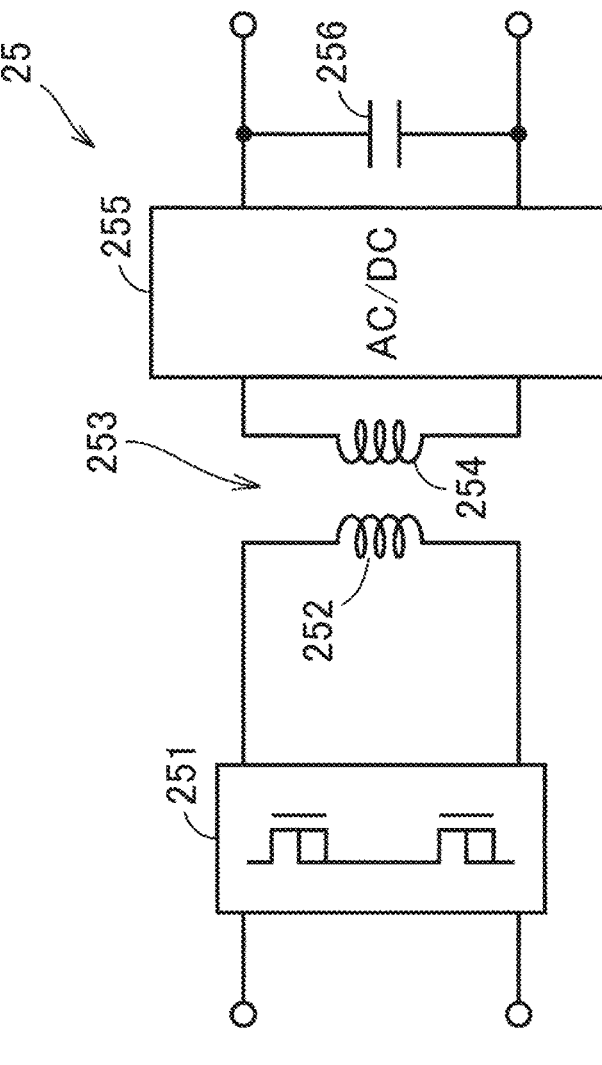
FIG. 13 illustrates an example of the configuration of a charging circuit shown in FIG. 12.

FIG. 13 illustrates an example of the configuration of the charging circuit 25. Referring to FIG. 13, the charging circuit 25 includes a power factor correction (PFC) circuit 251, an isolation transformer 253, an AC-to-DC converter circuit 255, and a capacitor 256. The PFC circuit 251 improves the power factor by bringing the AC power input from the AC power supply equipment to the inlet 21 closer to a sine wave. The isolation transformer 253 includes a primary coil 252 and a secondary coil 254. The isolation transformer 253 transforms an AC voltage at a ratio corresponding to the turns ratio between the primary coil 252 and the secondary coil 254. The transformed AC voltage is applied to the secondary coil 254. The AC-to-DC converter circuit 255 converts the AC voltage applied to the secondary coil 254 into DC power and outputs the DC power to the capacitor 256. The isolation transformer 253 according to this modification is an example of the "insulation circuit" according to the present disclosure.

Figure 14:
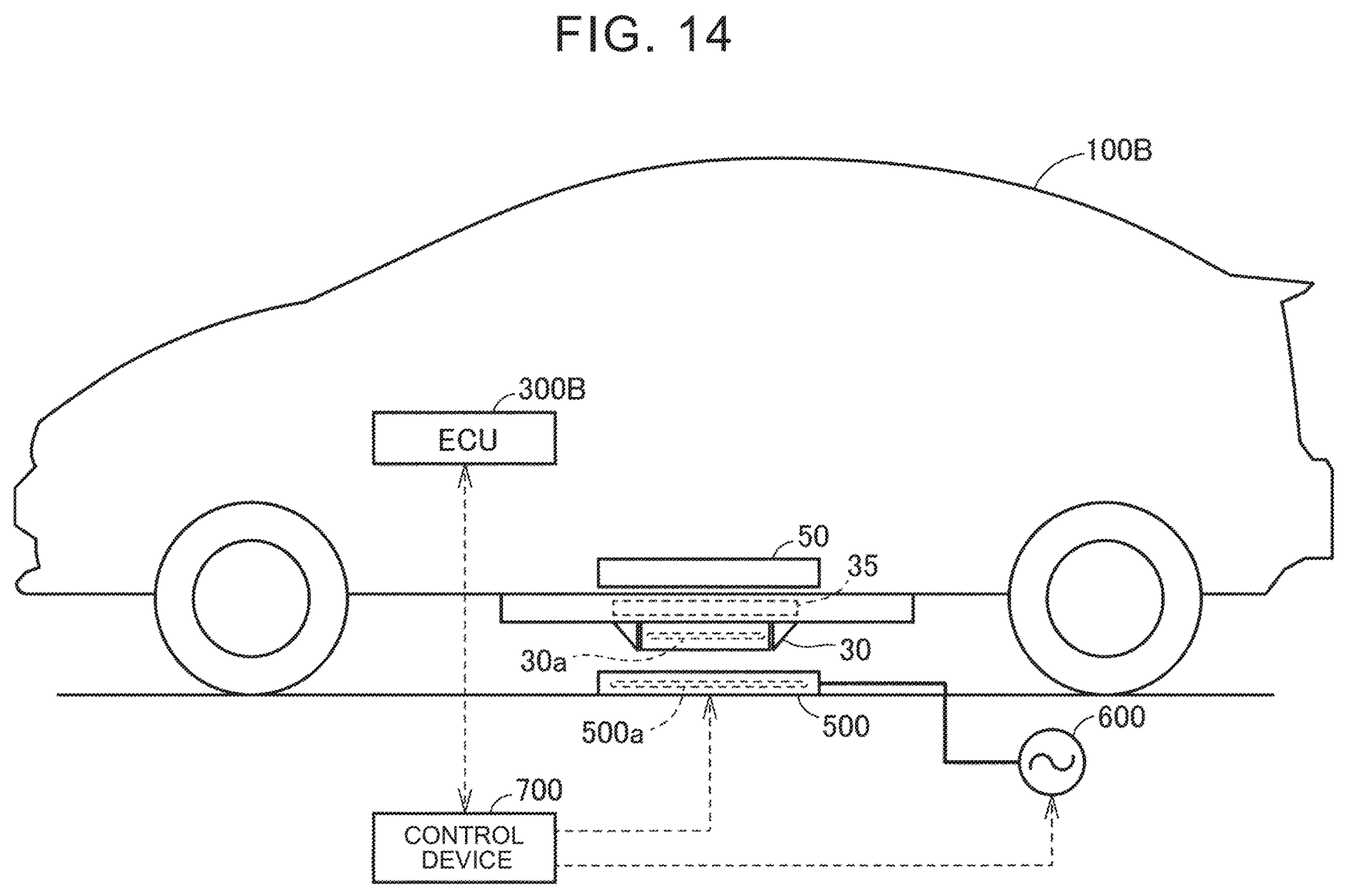

FIG. 14 illustrates an example of the configuration of a contactless charging system. Referring to FIG. 14, the power receiving unit 30 is mounted under the floor of the vehicle 100B. The power receiving unit 30 corresponds to the contactless charging port. Contactless power supply equipment includes a power transmitting unit 500, a power supply 600, and a control device 700 that controls the power transmitting unit 500 and the power supply 600. The power receiving unit 30 includes a power receiving coil 30a, and the power transmitting unit 500 includes a power transmitting coil 500a. The power supply 600 supplies AC power to the power transmitting unit 500. The control device 700 is configured so that the control device 700 can communicate wirelessly with the ECU 300B of the vehicle 100B. The power transmitting unit 500 is configured to transmit the electric power supplied from the power supply 600 from the power transmitting coil 500a to the power receiving coil 30a in a contactless manner with the power transmitting coil 500a and the power receiving coil 30a aligned to face each other. The alignment between the power transmitting coil 500a and the power receiving coil 30a is an example of "alignment before power transmission." There is a charging circuit 35 in a power path from the power receiving unit 30 to the battery 50. The charging circuit 35 is configured to convert the electric power supplied from the power transmitting unit 500 to the power receiving unit 30 into electric power suitable for charging the battery 50.

Figure 15:
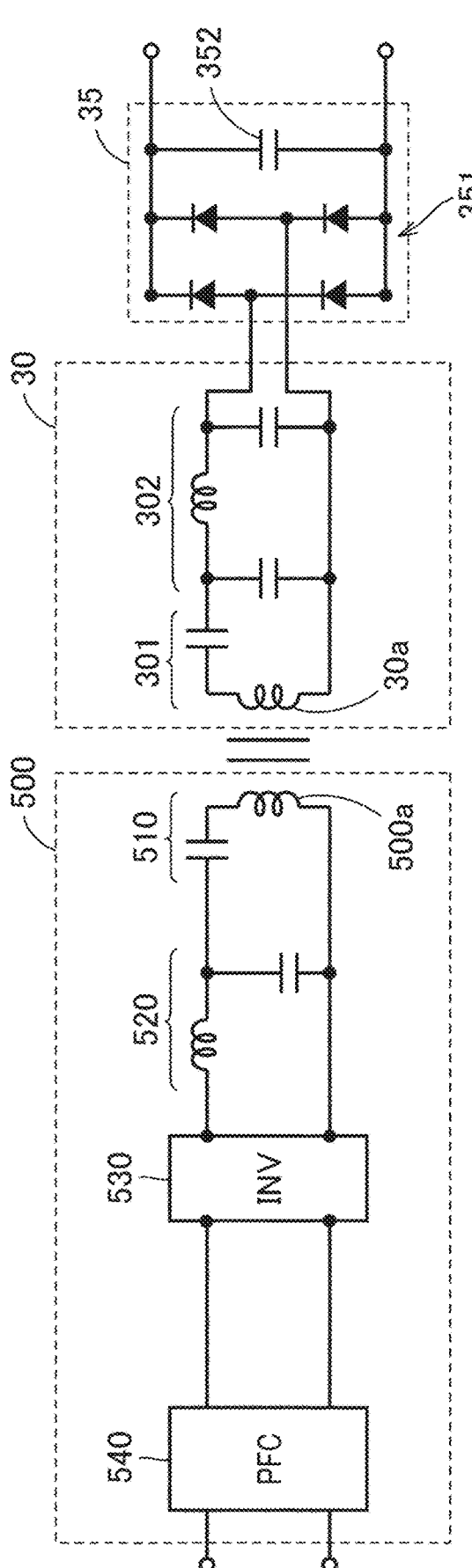
FIG. 15 illustrates an example of the configuration of a power transmitting unit, a power receiving unit, and a charging circuit that are shown in FIG. 14.

FIG. 15 illustrates an example of the configuration of the power transmitting unit 500, the power receiving unit 30, and the charging circuit 35. Referring to FIG. 15, the power transmitting unit 500 includes a resonant circuit 510, a filter circuit 520, an inverter 530, and a PFC circuit 540. The resonant circuit 510 is an inductor-capacitor (LC) resonant circuit including the power transmitting coil 500a. The power receiving unit 30 includes a resonant circuit 301 and a filter circuit 302. The resonant circuit 301 is an LC resonant circuit including the power receiving coil 30a. The charging circuit 35 includes an AC-to-DC converter circuit 351 and a capacitor 352. The AC-to-DC converter circuit 351 converts an AC voltage output from the power receiving unit 30 into DC power and outputs the DC power to the capacitor 352.

Referring back to FIG. 12, in this charging system, the wire connected to the inlet 11b and a wire connected to the charging circuit 25 are connected to each other by a connection portion E2. The wire connected to the inlet 11a and a wire connected to the charging circuit 35 are connected to each other by a connection portion E3. A wire connecting the connection portion E2 and the connection portion E3 and a wire connected to the charging relay 40 are connected to each other by the connection portion E1. The connection portion E1 is electrically connected to the battery 50 via the charging relay 40.

A power path from the connection portion E1 to the battery 50 is a common part of the power paths from the charging ports 10a, 10b, and 20 and the power receiving unit 30 to the battery 50. The charging relay 40 is disposed between the connection portion E1 and the battery 50 and is configured to connect and disconnect the common part. When the charging relay 40 is disconnected, the power paths from the charging ports 10a, 10b, and 20 and the power receiving unit 30 to the battery 50 are disconnected.

Figure 16:
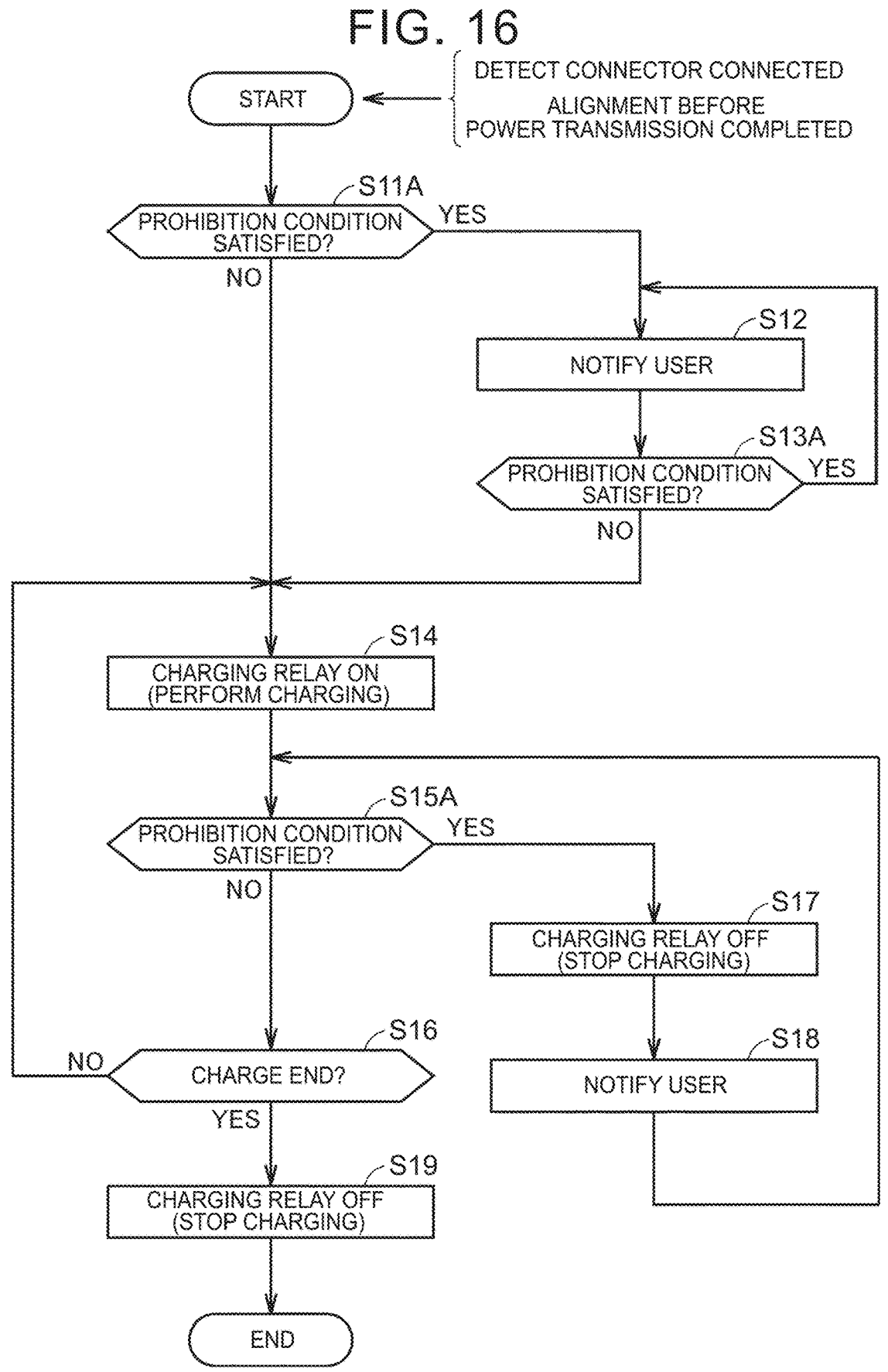
FIG. 16 is a flowchart illustrating a modification of the process shown in FIG. 7.

The ECU 300B executes a process shown in FIG. 16 described below instead of the process shown in FIG. 7. FIG. 16 is a flowchart illustrating a modification of the process shown in FIG. 7. The ECU 300B executes the process shown in this flowchart when the charging connector is connected to any of the charging ports 10a, 10b, and 20 and when alignment before power transmission is completed.

Figure 17:
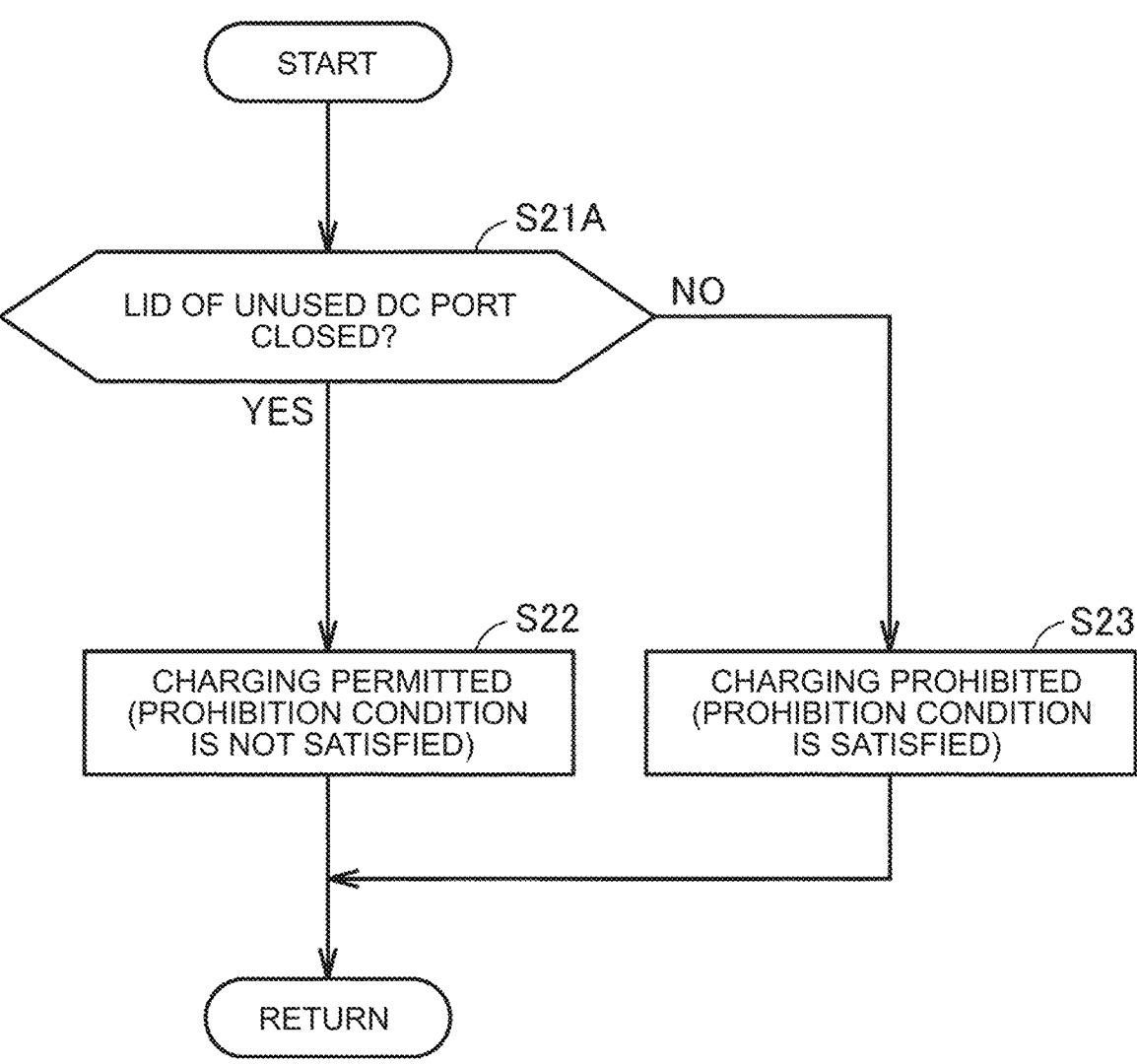
FIG. 17 is a flowchart illustrating a modification of the process shown in FIG. 8.

The process shown in FIG. 16 is basically the same as the process shown in FIG. 7. The process shown in FIG. 16 includes S11A, S13A, and S15A instead of S11, S13, and S15 in FIG. 7. In each of S11A, S13A, and S15A, the ECU 300B determines whether the prohibition condition is satisfied by executing, e.g., a process shown in FIG. 17 described below. FIG. 17 is a flowchart illustrating a modification of the process shown in FIG. 8.

Referring to FIG. 17 together with FIG. 12, in S21A, the ECU 300B determines whether the lid of the unused DC port is closed. For example, in the case where the used port is the charging port 10a (i.e., in the case where the charging connector is connected to the inlet 11a), the ECU 300B determines whether the lid 12b is closed. In the case where the used port is the charging port 20 (i.e., in the case where the charging connector is connected to the inlet 21), the ECU 300B determines whether both of the lids 12a, 12b are closed. In the case where the used port is the power receiving unit 30 (i.e., in the case where alignment before power transmission is completed), the ECU 300B determines whether both of the lids 12a, 12b are closed. In the case where the used port is either the charging port 20 or the power receiving unit 30, the determination result in S21A is No when at least one of the lids 12a, 12b is open.

In the case where the lid of the unused DC port is closed (YES in S21A), the ECU 300B determines in S22 that the prohibition condition is not satisfied (i.e., NO in S11A, S13A, and S15A in FIG. 16). The prohibition condition being not satisfied means that charging is permitted.

In the case where the lid of the unused DC port is open (NO in S21A), the ECU 300B determines in S23 that the prohibition condition is satisfied (i.e., YES in S11A, S13A, and S15A in FIG. 16). The prohibition condition being satisfied means that charging is prohibited.

In the charging system according to the modification, in the case where the lid of the unused port is open before charging of the battery 50 is started using the charging port 10a, 10b, or 20 or the power receiving unit 30, the ECU 300B opens (disconnects) the charging relay 40 so as not to start charging the battery 50. The charging ports 10a, 10b are DC ports. There is no AC-to-DC converter circuit in the power paths from the charging ports 10a, 10b to the battery 50. There is an AC-to-DC converter circuit (e.g., the AC-to-DC converter circuit 255 shown in FIG. 13) in the power path from the charging port 20 to the battery 50. There is an AC-to-DC converter circuit (e.g., the AC-to-DC converter circuit 351 shown in FIG. 15) in the power path from the power receiving unit 30 to the battery 50. Each of the charging ports 10a, 10b according to the modification is an example of the "second charging port" according to the present disclosure. Each of the charging port 20 and the power receiving unit 30 according to the modification is an example of the "first charging port" according to the present disclosure.

Since there is an AC-to-DC converter circuit in each of the power paths from the charging port 20 and the power receiving unit 30 to the battery 50, DC power output from the battery 50 is cut off by the AC-to-DC converter circuit. Therefore, even when either the charging port 20 or the power receiving unit 30 is electrically connected to the battery 50, the voltage of the battery 50 is not applied to the charging port (the charging port 20 or the power receiving unit 30). With this configuration, safety is ensured even when each of the charging port 20 and the power receiving unit 30 is electrically connected to the battery 50.

In the charging system according to the above modification, in the case where the lid of the unused DC port (charging port 10*a* or 10*b*) is open before charging of the battery 50 is started, the ECU 300B opens (disconnects) the charging relay 40. As the charging relay 40 is opened, the voltage of the battery 50 is not applied to the inlets 11*a*, 11*b*. When the lid of the unused DC port is closed, the ECU 300B starts charging the battery 50 by executing the charging relay ON. Even with this configuration, safety in the charging system can be improved by simple control.

In the above modification, whether the prohibition condition is satisfied is determined at the time when alignment before power transmission is completed. However, the present disclosure is not limited to this, and whether the prohibition condition is satisfied may be determined at the time when alignment before power transmission is started.

In the above modification, an AC port and a contactless charging port are used as the first charging ports, and two DC ports are used as the second charging ports. However, the number of first charging ports and the number of second charging ports can be changed as appropriate. For example, in the above modification, either the charging port 20 or the power receiving unit 30 may be omitted, or either the charging port 10*a* or the charging port 10*b* may be omitted. In the above modification, the power receiving unit 30 is not provided with a lid. However, a contactless charging port with a lid may be used as the first charging port.

The position of each charging port is not limited to the position shown in the embodiment and modification described above, and can be changed as appropriate. For example, the DC port may be provided on the front or rear side of the vehicle, on the rooftop of the vehicle, or under the floor of the vehicle.

Each charging port may be provided with an actuator that drives the open and close mechanism to open and close the lid. A mobile terminal capable of communicating with a communication device mounted on the vehicle may have a button for operating the lid of the charging port. In this case, when the button is operated by the user, the mobile terminal may instruct the vehicle to close the lid of a predetermined charging port. The button may be a button for specifying a used port. When the user specifies a used port before starting charging, the mobile terminal may instruct the vehicle to open the lid of the specified used port and to close the lid of the unused port. The button may be a button for closing the lid of the unused port. The mobile terminal may instruct the vehicle to close the lid of every charging port not used for charging when the user presses the button during charging. The control device mounted on the vehicle can open and close the lid of the charging port by controlling the actuator.

Figure 18:
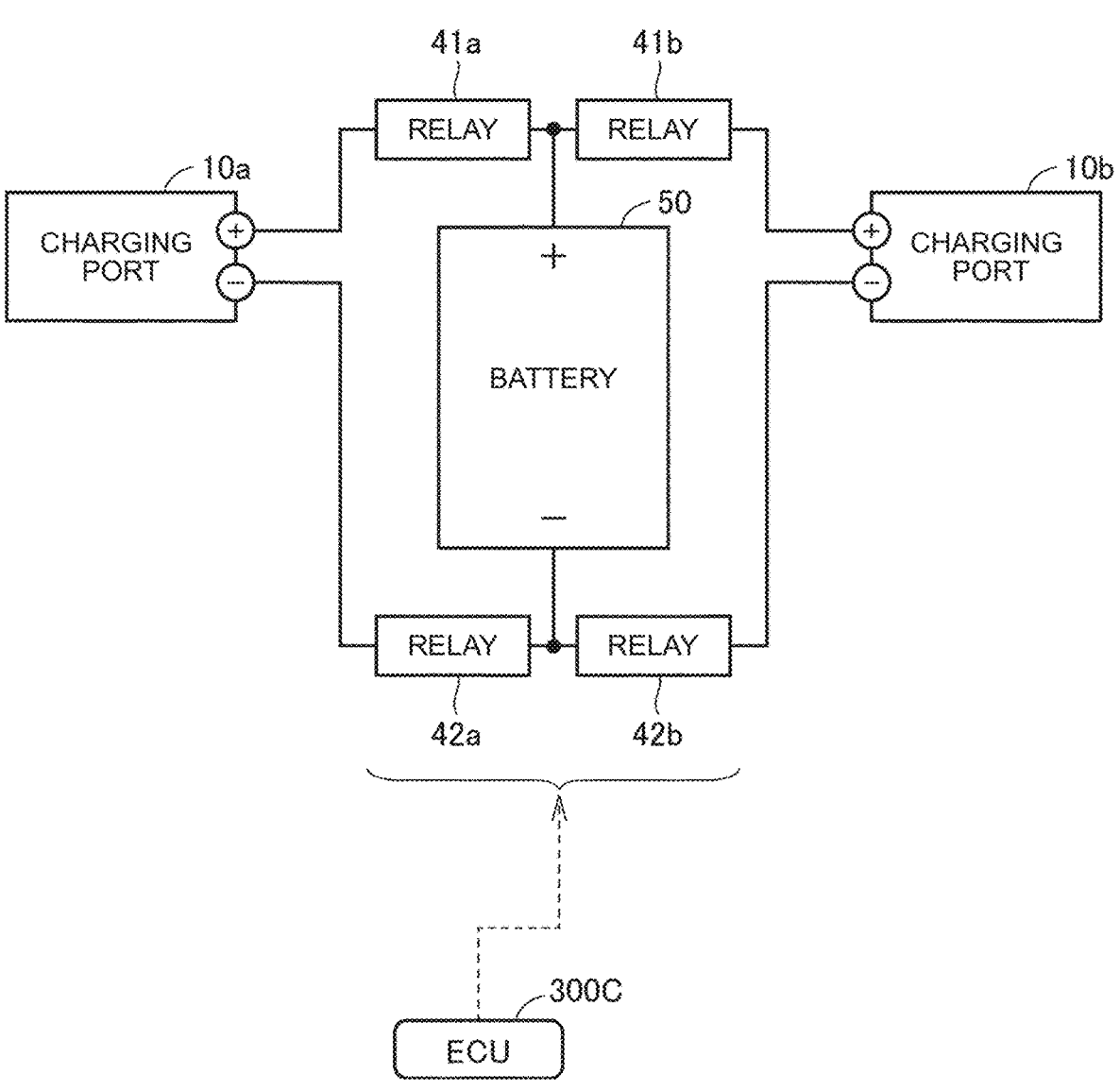
FIG. 18 illustrates a modification of a switch device shown in FIG. 3.

In the embodiment and modification described above, the charging relay 40 disposed in the common part of the power paths from the charging ports to the battery 50 is used as the switch device. However, the switch device may be any device that connects and disconnects the power paths from the charging ports to the electric energy storage device, and may use any opening and closing method. FIG. 18 illustrates a modification of the switch device.

Referring to FIG. 18, the switch device includes relays 41*a*, 42*a* disposed in the power path from the charging port 10*a* to the battery 50 and relays 41*b*, 42*b* disposed in the power path from the charging port 10*b* to the battery 50. An ECU 300C controls the relays 41*a*, 42*a*, 41*b*, and 42*b*.

In the case where the lid of the charging port 10*b* (unused port) is closed when charging of the battery 50 is started using the charging port 10*a*, the ECU 300C closes (connects) the relays 41*a*, 42*a* and opens (disconnects) the relays 41*b*, 42*b* to connect the power path from the charging port 10*a* to the battery 50. In the case where the lid of the charging port 10*a* (unused port) is closed when charging of the battery 50 is started using the charging port 10*b*, the ECU 300C opens (disconnects) the relays 41*a*, 42*a* and closes (connects) the relays 41*b*, 42*b* to connect the power path from the charging port 10*b* to the battery 50.

When the lid of the unused port is open when charging of the battery 50 is started using the charging port 10*a* or 10*b*, the ECU 300C opens (disconnects) the relays 41*a*, 42*a*, 41*b*, and 42*b* to disconnect the power paths from the charging ports 10*a*, 10*b* to the battery 50. The relays 41*a*, 42*a*, 41*b*, and 42*b* may be normally-off switches. When the relays 41*a*, 42*a*, 41*b*, and 42*b* are normally-off switches, the relays 41*a*, 42*a*, 41*b*, and 42*b* are open when not energized. A malfunction is therefore less likely to occur in the disconnected state.

According to the above control, it is safe as the lid of the unused port is closed even if the power path from the unused port to the battery 50 is connected due to a malfunction at the time when the power path from the used port to the battery 50 is connected.

It is not essential that the switch device includes a normally-off switch. A normally-on switch may be used instead of the normally-off switch.

The vehicle is not limited to an electric vehicle (EV). The travel drive device 70 shown in FIG. 1 may further include an engine (internal combustion engine), not shown. The vehicle may be a plug-in hybrid vehicle (PHV) capable of running on both the electric power stored in the battery 50 and the output of the engine. The configuration of the vehicle is not limited to the configuration shown in FIGS. 1 and 2. The vehicle may be a passenger car, a bus, or a truck. The vehicle may be configured to travel unmanned by autonomous driving or remote driving. The vehicle may be an automated guided vehicle (AGV) or a Mobility as a Service (MaaS) vehicle managed by a MaaS operator. The number of wheels is not limited to four and can be changed as appropriate. The number of wheels may be three or may be five or more.

The embodiment disclosed herein should be considered as illustrative and not restrictive in all respects. The scope of the present disclosure is shown by the claims, rather than by the above embodiment, and is intended to include all modifications within the meaning and scope equivalent to those of the claims.

What is claimed is:

1. A vehicle comprising:
an electric energy storage device;
a DC charging inlet to which a DC charging connector is configured to be connected;
a DC charging door sensor configured to determine when a DC charging door blocks charging using the DC charging connector;
an AC charging inlet to which an AC charging connector is configured to be connected;
an AC charging door sensor configured to determine when an AC charging door blocks charging using the AC charging connector;
a charging circuit that is connected to the AC charging inlet and that converts alternating-current power into direct-current power;
a shared wire through which direct-current power from the DC charging inlet and direct-current power from the charging circuit flow;

only one relay that is located in both an electrical path between the DC charging inlet and the electric energy storage device and an electrical path between AC charging inlet and the electric energy storage device, the relay being provided on the shared wire; and a control circuit configured to:

detect whether the DC charging connector is inserted into the DC charging inlet;

detect whether the AC charging door sensor indicates that the AC charging door blocks charging using the AC charging connector;

in response to a determination that the DC charging connector is inserted into the DC charging inlet, and only if the AC charging door sensor indicates that the AC charging door blocks charging using the AC charging connector, cause electric power to be supplied from the DC charging connector to the energy storage device;

detect whether the AC charging connector is inserted into the AC charging inlet;

detect whether the DC charging door sensor indicates that the DC charging door blocks charging using the DC charging connector; and in response to a determination that the AC charging connector is inserted into the AC charging inlet, and only if the DC charging door sensor indicates that the DC charging door blocks charging using the DC charging connector, cause electric power to be supplied from the AC charging connector to the energy storage device.

2. The vehicle according to claim 1, wherein the control circuit is configured to:

in response to a determination that the DC charging connector is inserted into the DC charging inlet, set the relay in an ON state so electric power is supplied from the DC charging inlet to the electric energy storage device, and turn the charging circuit OFF so an electric connection between the AC charging inlet and the electric energy storage device is disconnected.

3. The vehicle according to claim 1, further comprising:

a vehicle body including a first side surface and a second side surface that are arrayed in a vehicle width direction, wherein the DC charging inlet and the AC charging inlet are provided on the first side surface.

4. The vehicle according to claim 1, further comprising:

a vehicle body including a first side surface and a second side surface that are arrayed in a vehicle width direction; and another DC charging inlet to which another DC charging connector other than the DC charging connector is configured to be connected, wherein the DC charging inlet and the AC charging inlet are provided on the first side surface, and the other DC charging connector is provided on the second side surface.

5. The vehicle according to claim 4, further comprising:

another relay that is provided between the other DC charging inlet and the electric energy storage device.

* * * * *